(12) United States Patent
Adams et al.

(10) Patent No.: US 7,261,826 B2
(45) Date of Patent: Aug. 28, 2007

(54) ELECTROSTATIC ACTUATOR FOR MICROELECTROMECHANICAL SYSTEMS AND METHODS OF FABRICATION

(75) Inventors: Scott Adams, Ithaca, NY (US); Tim Davis, Trumansburg, NY (US); Scott Miller, Ithaca, NY (US); Kevin Shaw, Ithaca, NY (US); John Matthew Chong, Santa Barbara, CA (US); Seung Bok (Chris) Lee, Ithaca, NY (US)

(73) Assignee: Calient Networks, Inc., San Jose, CA (US)

( * ) Notice: Subject to any disclaimer, the term of this patent is extended or adjusted under 35 U.S.C. 154(b) by 0 days.

(21) Appl. No.: 10/766,087

(22) Filed: Jan. 27, 2004

(65) Prior Publication Data

US 2004/0246306 A1    Dec. 9, 2004

Related U.S. Application Data

(62) Division of application No. 09/775,491, filed on Feb. 2, 2001, now Pat. No. 6,753,638.

(60) Provisional application No. 60/179,912, filed on Feb. 3, 2000.

(51) Int. Cl.
*C23F 1/00* (2006.01)
*H01L 21/00* (2006.01)

(52) U.S. Cl. .......................................... 216/2; 438/52

(58) Field of Classification Search .................. 216/2, 216/11, 17, 20, 24, 33, 36; 438/22, 24, 48, 438/50, 52, 53, 689, 694, 696, 700, 702; 257/414–419; 73/514.15–514.39
See application file for complete search history.

(56) References Cited

U.S. PATENT DOCUMENTS

| | | |
|---|---|---|
| 3,493,820 A | 2/1970 | Rosvold |
| 4,104,086 A | 8/1978 | Bondur et al. |
| 4,421,381 A | 12/1983 | Ueda et al. |

(Continued)

FOREIGN PATENT DOCUMENTS

DE    19757171 A1    7/1999

(Continued)

OTHER PUBLICATIONS

Timothy J. Broshnihan, James M. Bustillo, Albert P. Pisano & Roger T. Howe, "Embedded Interconnect & Electrical Isolation for High-Aspect-Ratio, SOI Inertial Instruments," Berkeley Sensor & Actuator Sensor, pp. 637-640, Transducers '97, 1997 International Conference on Solid-State Sensors and Actuators (Chicago, Jun. 16-19, 1997).

(Continued)

*Primary Examiner*—Parviz Hassanzadeh
*Assistant Examiner*—Roberts Culbert
(74) *Attorney, Agent, or Firm*—Blakely, Sokoloff, Taylor & Zafman LLP

(57) ABSTRACT

A method and apparatus are described that may be used to provide decoupled rotation of structures about different pivot points. The apparatus may include one or more fixed blades mounted to a frame or substrate, one or more movable blades mounted to each structure to be moved, and flexures on which the structures are suspended. Separate movable blades may be provided for each degree of freedom. When voltage is applied between the fixed and movable blades, the electrostatic attraction generates a force attracting movable blades toward blades that are fixed relative to the moveable blades, causing a structure to rotate about the flexures. The angle of rotation that results may be related to the size, number and spacing of the blades, the stiffness of the flexures and the magnitude of the voltage difference applied to the blades. The blades are fabricated using deep silicon etching.

28 Claims, 29 Drawing Sheets

U.S. PATENT DOCUMENTS

| | | | |
|---|---|---|---|
| 4,509,249 A | 4/1985 | Goto et al. | |
| 4,519,128 A | 5/1985 | Chesebro et al. | |
| 4,553,436 A | 11/1985 | Hansson | |
| 4,571,819 A | 2/1986 | Rogers et al. | |
| 4,613,203 A | 9/1986 | Proetel et al. | |
| 4,670,092 A | 6/1987 | Motamedi | |
| 4,688,069 A | 8/1987 | Joy et al. | |
| 4,706,374 A | 11/1987 | Murakami | |
| 4,738,500 A | 4/1988 | Grupp et al. | |
| 4,784,720 A | 11/1988 | Douglas | |
| 4,855,017 A | 8/1989 | Douglas | |
| 4,876,217 A | 10/1989 | Zdebel | |
| 5,068,203 A | 11/1991 | Logsdon et al. | |
| 5,083,857 A | 1/1992 | Hornbeck | |
| 5,097,354 A | 3/1992 | Goto | |
| 5,172,262 A | 12/1992 | Hornbeck | |
| 5,198,390 A | 3/1993 | MacDonald et al. | |
| 5,203,208 A | 4/1993 | Bernstein | |
| 5,226,321 A | 7/1993 | Varnham et al. | |
| 5,235,187 A | 8/1993 | Arney et al. | |
| 5,316,979 A | 5/1994 | MacDonald et al. | |
| 5,345,824 A | 9/1994 | Sherman et al. | |
| 5,391,236 A | 2/1995 | Krut et al. | |
| 5,393,375 A | 2/1995 | MacDonald et al. | |
| 5,397,904 A | 3/1995 | Arney et al. | |
| 5,399,415 A | 3/1995 | Chen et al. | |
| 5,426,070 A | 6/1995 | Shaw et al. | |
| 5,427,975 A | 6/1995 | Sparks et al. | |
| 5,428,259 A | 6/1995 | Suzuki | |
| 5,449,903 A | 9/1995 | Arney et al. | |
| 5,454,906 A | 10/1995 | Baker et al. | |
| 5,463,246 A | 10/1995 | Matsunami | |
| 5,485,039 A | 1/1996 | Fujita et al. | |
| 5,488,862 A | 2/1996 | Neukermans et al. | |
| 5,501,893 A | 3/1996 | Laermer et al. | |
| 5,506,175 A | 4/1996 | Zhang et al. | |
| 5,536,988 A | 7/1996 | Zhang et al. | |
| 5,554,304 A | 9/1996 | Suzuki | |
| 5,563,343 A | 10/1996 | Shaw et al. | |
| 5,591,679 A * | 1/1997 | Jakobsen et al. | 438/51 |
| 5,599,744 A | 2/1997 | Koh et al. | |
| 5,600,383 A | 2/1997 | Hornbeck | |
| 5,608,264 A | 3/1997 | Gaul | |
| 5,610,335 A | 3/1997 | Shaw et al. | |
| 5,611,888 A | 3/1997 | Bosch et al. | |
| 5,611,940 A | 3/1997 | Zettler | |
| 5,628,917 A | 5/1997 | MacDonald et al. | |
| 5,629,790 A | 5/1997 | Neukermans et al. | |
| 5,637,189 A | 6/1997 | Peeters et al. | |
| 5,642,015 A | 6/1997 | Whitehead et al. | |
| 5,645,684 A | 7/1997 | Keller | |
| 5,646,067 A | 7/1997 | Gaul | |
| 5,648,618 A | 7/1997 | Neukermans et al. | |
| 5,673,139 A | 9/1997 | Johnson | |
| 5,682,062 A | 10/1997 | Gaul | |
| 5,696,619 A | 12/1997 | Knipe et al. | |
| 5,703,728 A | 12/1997 | Smith et al. | |
| 5,719,073 A * | 2/1998 | Shaw et al. | 438/53 |
| 5,726,073 A | 3/1998 | Zhang et al. | |
| 5,739,941 A | 4/1998 | Knipe et al. | |
| 5,759,913 A | 6/1998 | Fulford, Jr. et al. | |
| 5,770,465 A | 6/1998 | MacDonald et al. | |
| 5,784,187 A | 7/1998 | Cunningham et al. | |
| 5,798,557 A | 8/1998 | Salatino et al. | |
| 5,804,084 A | 9/1998 | Nasby et al. | |
| 5,814,889 A | 9/1998 | Gaul | |
| 5,846,849 A | 12/1998 | Shaw et al. | |
| 5,847,454 A | 12/1998 | Shaw et al. | |
| 5,853,959 A | 12/1998 | Brand et al. | |
| 5,912,094 A | 6/1999 | Aksyuk et al. | |
| 5,912,608 A | 6/1999 | Asada | |
| 5,915,168 A | 6/1999 | Salatino et al. | |
| 5,920,417 A | 7/1999 | Johnson | |
| 5,933,746 A | 8/1999 | Begley et al. | |
| 5,959,760 A | 9/1999 | Yamada et al. | |
| 5,969,848 A | 10/1999 | Lee et al. | |
| 5,973,396 A | 10/1999 | Farnworth | |
| 5,998,816 A | 12/1999 | Nakaki et al. | |
| 5,998,906 A | 12/1999 | Jerman et al. | |
| 5,999,303 A | 12/1999 | Drake | |
| 6,000,280 A | 12/1999 | Miller et al. | |
| 6,020,272 A | 2/2000 | Fleming | |
| 6,028,689 A | 2/2000 | Michalicek et al. | |
| 6,030,887 A * | 2/2000 | Desai et al. | 438/507 |
| 6,040,935 A | 3/2000 | Michalicek | |
| 6,044,705 A | 4/2000 | Neukermans et al. | |
| 6,066,265 A | 5/2000 | Galvin et al. | |
| 6,072,617 A | 6/2000 | Henck | |
| 6,074,890 A * | 6/2000 | Yao et al. | 438/52 |
| 6,075,639 A | 6/2000 | Kino et al. | |
| 6,078,016 A | 6/2000 | Yoshikawa et al. | |
| 6,097,858 A | 8/2000 | Laor | |
| 6,097,859 A | 8/2000 | Solgaard et al. | |
| 6,097,860 A | 8/2000 | Laor | |
| 6,101,299 A | 8/2000 | Laor | |
| 6,107,109 A | 8/2000 | Akram et al. | |
| 6,107,115 A | 8/2000 | Atobe et al. | |
| 6,121,552 A | 9/2000 | Brosnihan et al. | |
| 6,128,121 A | 10/2000 | Choi et al. | |
| 6,146,248 A | 11/2000 | Jairath et al. | |
| 6,149,190 A | 11/2000 | Galvin et al. | |
| 6,170,332 B1 | 1/2001 | MacDonald et al. | |
| 6,180,536 B1 | 1/2001 | Chong et al. | |
| 6,199,874 B1 | 3/2001 | Galvin et al. | |
| 6,201,629 B1 | 3/2001 | McClelland et al. | |
| 6,201,631 B1 | 3/2001 | Greywall | |
| 6,220,561 B1 | 4/2001 | Garcia | |
| 6,239,473 B1 | 5/2001 | Adams et al. | |
| 6,245,590 B1 | 6/2001 | Wine et al. | |
| 6,253,001 B1 | 6/2001 | Hoen | |
| 6,262,827 B1 | 7/2001 | Ueda et al. | |
| 6,285,490 B1 | 9/2001 | Meier et al. | |
| 6,295,154 B1 | 9/2001 | Laor et al. | |
| 6,300,665 B1 | 10/2001 | Peeters et al. | |
| 6,323,982 B1 | 11/2001 | Hornbeck | |
| 6,329,738 B1 | 12/2001 | Hung et al. | |
| 6,330,102 B1 | 12/2001 | Daneman et al. | |
| 6,337,760 B1 | 1/2002 | Huibers et al. | |
| 6,342,430 B1 | 1/2002 | Adams et al. | |
| 6,353,492 B2 | 3/2002 | McClelland et al. | |
| 6,368,881 B1 | 4/2002 | Brouillette et al. | |
| 6,404,313 B2 | 6/2002 | Asada | |
| 6,428,713 B1 * | 8/2002 | Christenson et al. | 216/2 |
| 6,444,138 B1 | 9/2002 | Moon et al. | |
| 6,458,615 B1 | 10/2002 | Fedder et al. | |
| 6,462,391 B1 | 10/2002 | Chong et al. | |
| 6,464,892 B2 | 10/2002 | Moon et al. | |
| 6,467,345 B1 | 10/2002 | Neukermans et al. | |
| 6,483,961 B1 | 11/2002 | Helkey et al. | |
| 6,538,799 B2 | 3/2003 | McClelland et al. | |
| 6,552,840 B2 | 4/2003 | Knipe | |
| 6,560,384 B1 | 5/2003 | Helkey et al. | |
| 6,563,106 B1 | 5/2003 | Bowers et al. | |
| 6,626,039 B1 | 9/2003 | Adams et al. | |
| 6,628,041 B2 | 9/2003 | Lee et al. | |
| 6,643,425 B1 | 11/2003 | Bowers et al. | |
| 6,668,108 B1 | 12/2003 | Helkey et al. | |
| 6,706,200 B2 | 3/2004 | Moon et al. | |
| 6,753,638 B2 | 6/2004 | Adams et al. | |
| 6,756,247 B1 | 6/2004 | Davis et al. | |
| 7,098,571 B2 | 8/2006 | Adams et al. | |
| 2001/0044165 A1 | 11/2001 | Lee et al. | |
| 2002/0039464 A1 | 4/2002 | Yoshimura et al. | |
| 2002/0071171 A1 | 6/2002 | Greywall | |

| | | | |
|---|---|---|---|
| 2002/0093721 | A1 | 7/2002 | Knipe |

FOREIGN PATENT DOCUMENTS

| | | | |
|---|---|---|---|
| DE | 19800745 A1 | 7/1999 | |
| EP | 0 813 089 A2 | 12/1997 | |
| EP | 0 834759 A2 | 4/1998 | |
| EP | 0 980014 A1 | 2/2000 | |
| EP | 1 120677 A2 | 8/2001 | |
| GB | 2 175 705 A | 12/1986 | |
| GB | 2 239 101 A | 6/1991 | |
| GB | 2 275 787 A | 9/1994 | |
| JP | 60-107017 | 6/1985 | |
| JP | 4-343318 A | 11/1992 | |
| JP | 5-55401 A | 3/1993 | |
| JP | 5-107485 A | 4/1993 | |
| JP | 6-180428 | 6/1994 | |
| WO | WO94/18697 | 8/1994 | |
| WO | WO97/04283 | 2/1997 | |
| WO | WO99/36941 | 7/1999 | |
| WO | WO99/36948 | 7/1999 | |
| WO | WO9936948 A1 * | 7/1999 | |
| WO | WO99/67666 | 12/1999 | |
| WO | WO 01/33898 A2 | 5/2001 | |
| WO | WO 01/39413 A2 | 5/2001 | |
| WO | WO 01/57902 A2 | 8/2001 | |

OTHER PUBLICATIONS

Janusz Bryzek, Kurt Petersen & Wendell McCulley, "Micromachines on the March," IEEE Spectrum, pp. 20-31 (May 1994).

Wolfgang Kuehnel and Steven Sherman, "A Surface Micromachined Silicon Acclerometer with On-Chip Detection Circuitry," Sensors and Actuators A 45, pp. 7-16 (1994).

Howard K. Rockstad, et al., "A Miniature High-Sensivitivity Broadband Accelerometer Based on Electron Tunneling Transducers," Sensors and Actuators A 43, pp. 107-114 (1994).

Lynn Michelle Roylance and James B. Angell, "A Batch-Fabricated Silicon Accelerometer," IEEE Transactions on Electron Devices, vol. Ed-26, No. 12, pp. 1911-1917 (Dec. 1979).

Kevin A. Shaw, et al., "SCREAM I: A Single Mask, Single-Crystal Silicon, Reactive Ion Etching Process for Microelectromechanical Structures," Sensors and Actuators A, 40 pp. 63-70 (1994).

Toshiki Hirano, et al., "Design, Fabrication, and Operation for Submicron Gap Comb-Drive Microactuators," J. of Microelectromechanical Systems, vol. 1, No. 1, pp. 52-59, (Mar. 1992).

V.P. Jaecklin, et al., "Comb Actuators for XY-Microstages," Sensors and Actuators, A, 39, pp. 83-89 (1993).

Susanne C. Arney and Noel C. MacDonald, et al., "Formation of Submicron Silicon-On-Insulator Sructures by Lateral Oxidation of Substrate-Slicon Islands," J. Vac. Sci. Technol. B vol. 6 No. 1, pp. 341-345, (Jan./Feb. 1988).

"Lucent's New All-Optical Router Uses Bell Labs Microscopic Mirrors," Bells Labs press release, pp. 1-4, Nov. 10, 1999. http://www.bell-labs.com/news/1999/november/10/1.html.

Rudolf F. Graf, Radio Shack Dictionary of Electronics, p. 639, Definition of Varibale Capacitor with Picture (1974).

M. Adrian Michalicek, Wenge Zhang, Kevin F. Harsh, Victor M. Bright, and Y.C. Lee, "Micromirror Arrays Fabricated by Flip-Chip Assembly," Part of the SPIE Conference on Miniaturizes Systems with Micro-Optics and MEMs, Santa Clara, SPIE vol. 3878, pp. 68-79 (Sep. 1999).

Chris Seung-Bok Lee, Sejin Han, Noel C. MacDonald, "Multiple Depth, Single Crystal Silicon MicroActuators for Large Displacement Fabricated by Deep Reactive Ion Etching," Solid-State Sensor and Actuator Workshop, Hilton Head Island, SC, pp. 45-50 (Jun. 8-11, 1998).

Russell Y. Webb, Scott G. Adams, and Noel C. MacDonald, "Suspended Thermal Oxide Trench Isolation for SCS MEMS." SPIE vol. 3519, Boston, MA, pp. 196-199 (Nov. 1998).

Seung Chris B. Lee, "Two-Depth, Single Crystal Silicon Microelectromechanical Systems." A Dissertation Presented to the Faculty of the Graduate School of Cornell University in Partial Fulfillment of the Requirements for the Degree of Doctor of Philosophy, (Jan. 2000).

Leslie A. Field, Diane L. Burriesci, Peter R. Robrish, and Richard C. Ruby, "Micromachined 1×2 Optical-Fiber Switch," Sensors and Actuators A, 53, pp. 311-315, (1996).

Larry J. Hombeck, "Digital Light Proecssing for High-Business, High-Resolution Applications," SPIE vol. 3013, San Jose, CA, pp. 27-40 (Feb. 1997).

Noel C. MacDonald, "SCREAM MicroElectroMechanical Systems." Microelectronic Engineering, 32, pp. 49-73 (1996).

Ming C. Wu, "MEMS for Optical and RF Applications." UCLA Extension, Department of Engineering, Information Systems and Technical Management, Engineering: 823.52, Nov. 1-3, 1999.

Wolfgang Hofmann, Chris S. Lee, and Noel C. MacDonald, Monolithic Three-Dimensional Single-Crystal Silicon Microelectromechanical Systems, Sensors and Materials, vol. 10, No. 6, pp. 337-350 (1998).

William C. Tang, Martin G. Lim, and Roger T. Howe, "Electrostatic Comb Drive Levitation and Control Method" Journal of Microelectromechanical Systems, vol. 1, No. 4, pp. 170-178 (Dec. 1992).

M.C. Wu, L.-Y Lin, S.-S. Lee, and K.S.J. Pister, "Micromachined Free-Space Integrated Micro-Optics," Sensors and Actuators A, 50, pp. 127-134 (1995).

Joseph E. Ford, Vladimir A. Aksyuk, David J. Bishop, and James A. Walker, "Wavelength Add-Drop Switching Using Tilting Micromirrors," Journal of Lightwave Technology, vol. 17, No. 5, pp. 904-911 (May 1999).

D.T. Neilson, V.A. Aksyuk, S. Arney, N.R. Basavanhally, K.S. Bhalla, D.J. Bishop, B.A. Boie, C.A. Bolle, J.V. Gates, A.M. Gottlieb, J.P. Hickey, N.A. Jackman, P.R. Kolodner, S.K. Korotky, B. Mikkelsen, F. Pardo, G. Raybon, R. Ruel, R.E. Scotti, T.W. Van Blarcum, , L. Zhang, and C.R. Giles, "Fully Provisional 112×112 Micro-Mechanical Optical Crossconnect With 35.8Tb/s Demonstrated Capacity," OFC 2000 Tech. Dig., Baltimore, Maryland, pp. 202-204 (Mar. 7-10, 2000).

Robert E. Mihailovich, Z. L. Zhang, K. A. Shaw, and Noel C. MacDonald, "Single-Crystal Silicon Torsional Resonators." School of Electrical Engineering, Cornell University, Ithaca, NY 14853, pp. 184-188, IEEE (Feb. 1993).

M.T.A. Salf and N. C. MacDonald, "Planarity of Large MEMS," Journal of Microelectromechanical Systems, 5, 79-97 (1996).

W.-H. Juan and S.W. Pang, "High-aspect-ration Si Vertical Micromirror Arrays for Optical Switching," Journal of MicroElectroMechanical Systems, 7, 207, -213 (1998).

U.Gosele, et al., "Wafer Bonding for Microsystems Technologies," Sensors and Actuators A, vol. 74, pp. 161-168 (1999).

Rob Legtenberg, et al., "Comb-drive actuators for large displacements," Journal of Micromechaniss and Microengineering, vol. 6, No. 2, pp. 320-329. Jun. 1996.

Ronald E. Scotti et al., "The Challenges of Packaging MEMS Components for the All Optical Network of the Future," Design, Test, Integration, and Packaging of MEMS/MOEMS 2001, vol. 4408, pp. 19-27 (Apr. 25-27, 2001).

Chris S.B. Lee, Sejin Han, and Noel C. MacDonald, "Single Crystal Silicon (SCS) XY-Stage Fabricated by DRIE and IR alignment," MEMS 2000: The Thirteenth Annual International Conference on Micro Electro Mechanical Systems, pp. 28-33 (Jan. 23-27, 2000).

Chris S.B. Lee, Russell Y. Webb, John M. Chong, and Noel C. MacDonald, "Single Crystal Silicon (SCS) MicroMirror Arrays using Deep Silicon Etching and IR Alignment," MEMS 2000: The Thirteenth Annual International Conference on Micro Electro Mechanical Systems, pp. 441-448 (Jan. 23-27, 2000).

A. Azzam Yasseen, Joseph N. Mitchell, James F. Klemic, David A. Smith, and Mehran Mehregany, "A Rotary Electrostatic Micromotor 1×8 Optical Switch," IEEE Journal of Selected Topics in Quantum Electronics, vol. 5, No. 1, pp. 26-31 (Jan./Feb. 1999).

G. K. Fedder, S. Santhanam, M. L. Reed, S. C. Eagle, D. F. Guillou, M. S.-C. Lu, and L. R. Carley, "Laminated High-Aspect-Ratio Microstructures In A Conventional CMOS Process," Proceedings of the IEEE Micro Electro Mechanical Systems Workshop, San Diego, CA, pp. 13-18 (Feb. 1996).

PCT Notification of Transmittal of The International Search Report or The Declaration for PCT Counterpart Application No. PCT/US01/03760 Containing International Search Report (Sep. 5, 2001).

PCT Notification of Transmittal of International Preliminary Examination Report for PCT Counterpart Application No. PCT/US01/03760, 5 pgs. (Jan. 29, 2002).

* cited by examiner

250um

150um

10

10
13
150
15

10
13
15

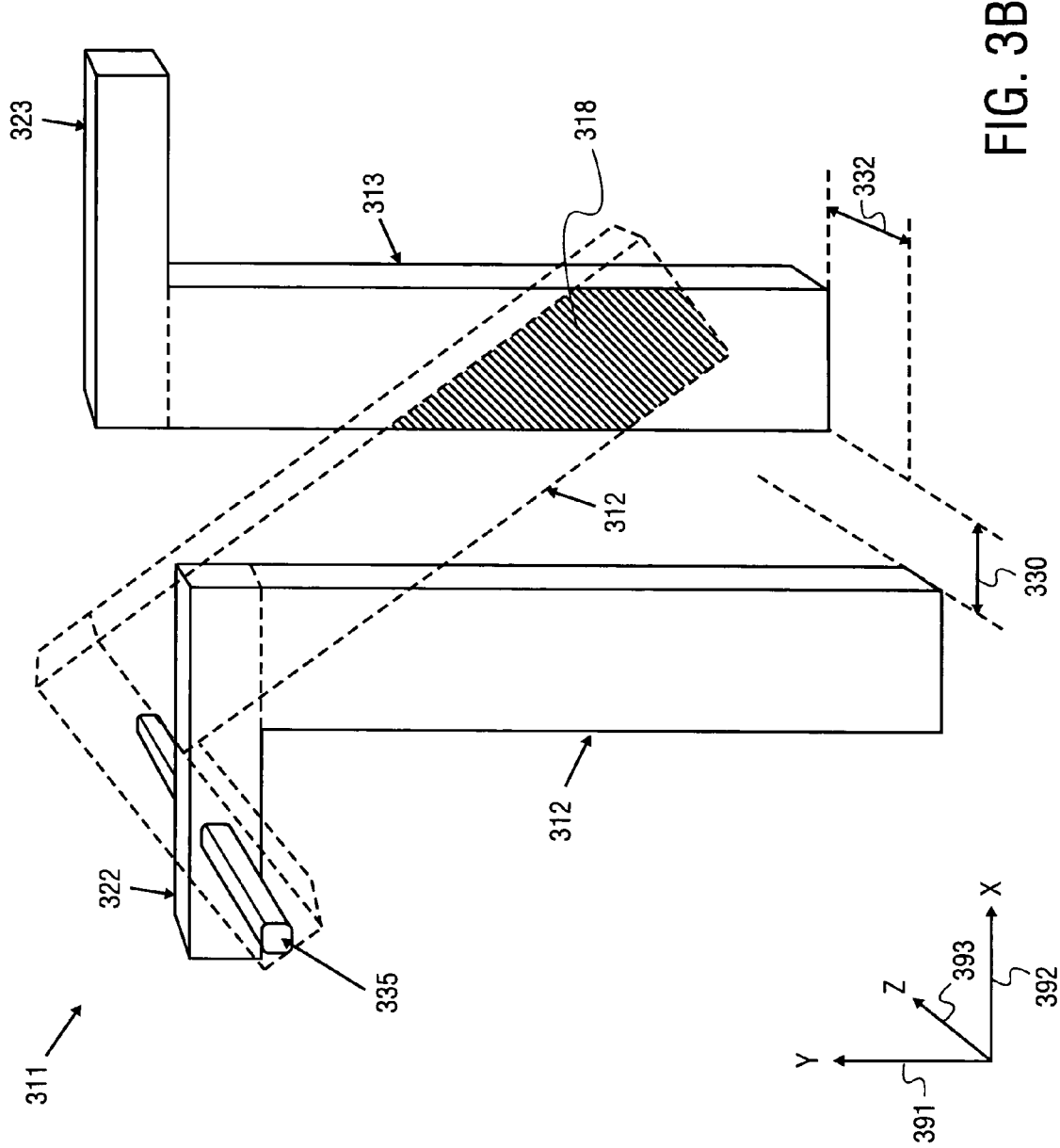

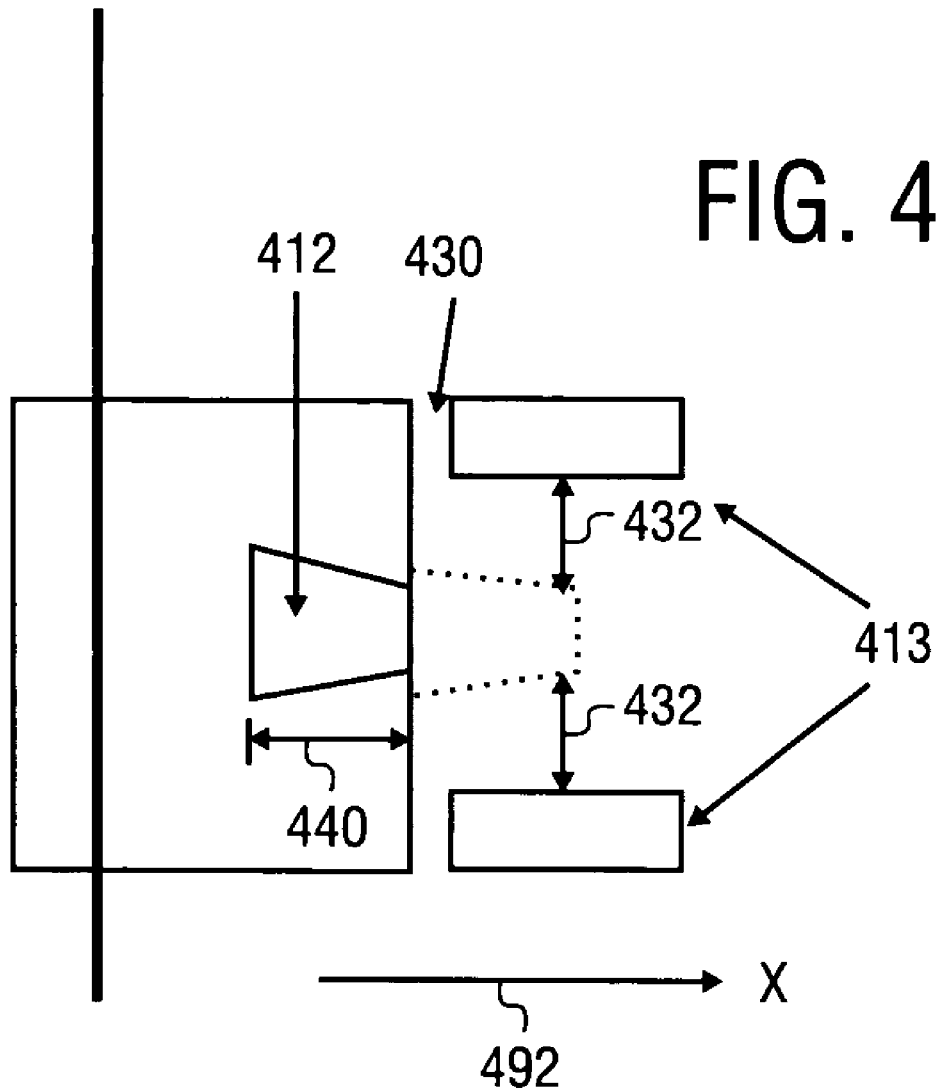

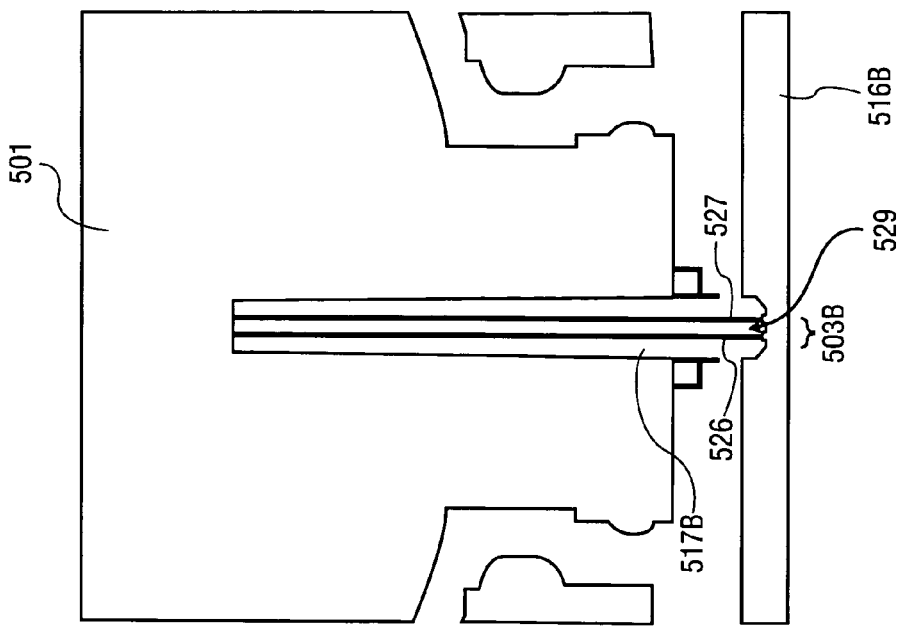
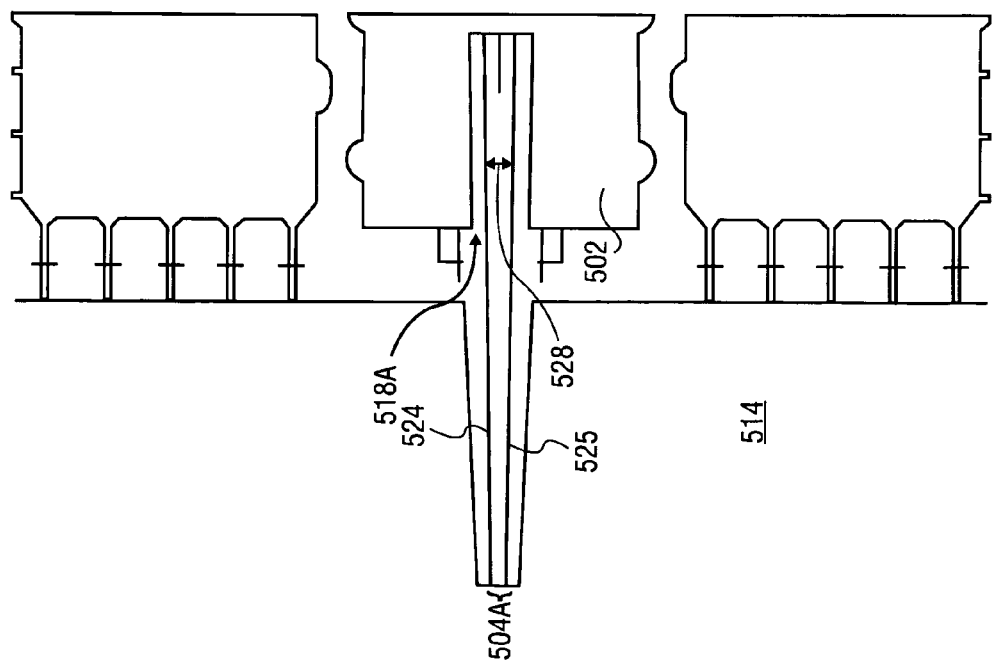
FIG. 5C
FIG. 5B

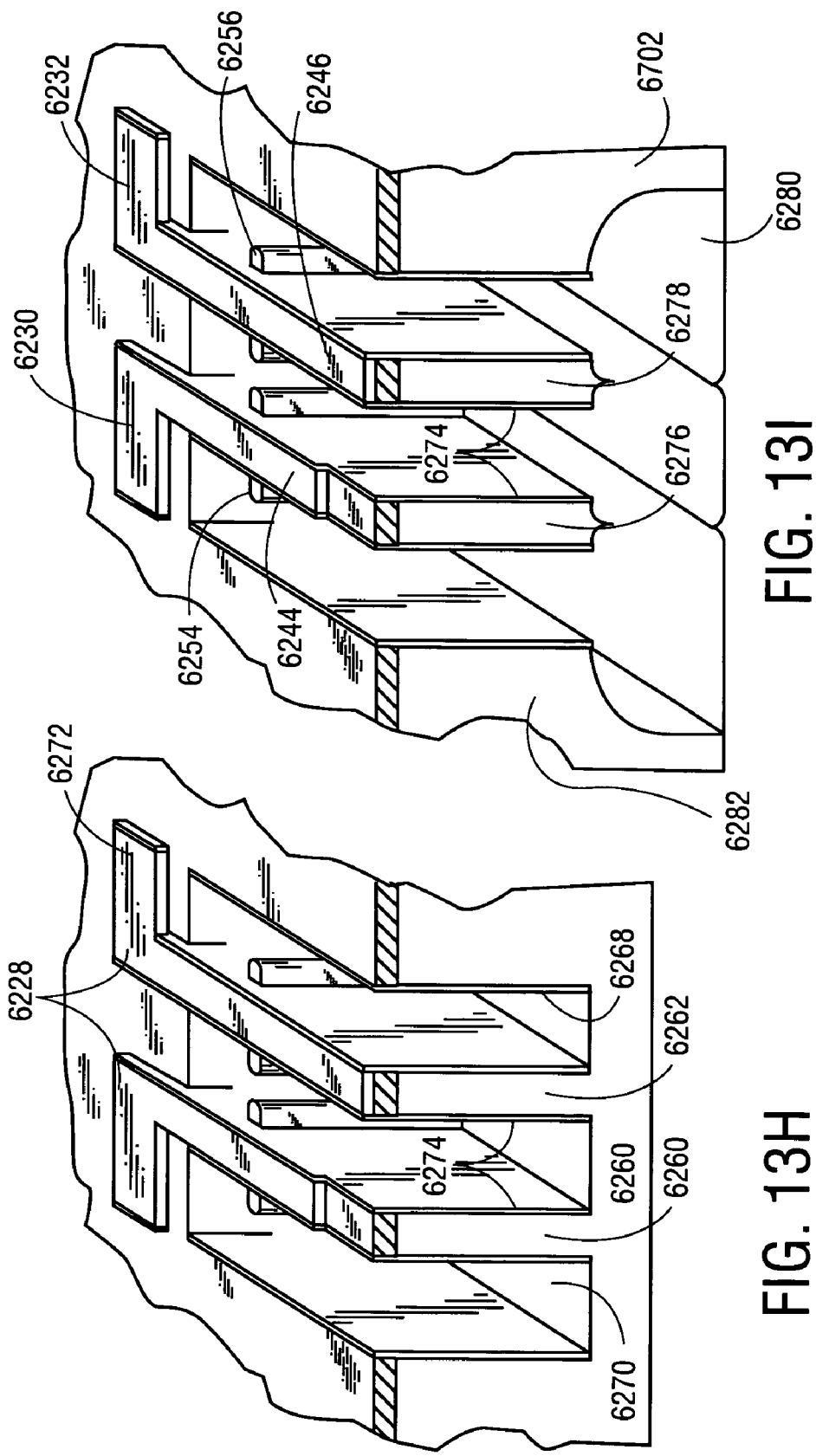

ELECTROSTATIC ACTUATOR FOR MICROELECTROMECHANICAL SYSTEMS AND METHODS OF FABRICATION

REFERENCE TO RELATED APPLICATIONS

This application claims the benefit under 35 U.S.C. Section 119(e) of U.S. Provisional Application No. 60/179,912, filed Feb. 3, 2000, entitled Electrostatic Actuator for Micro Electro-Mechanical Systems With Method of Manufacture, and Product Using Same, and also claims priority from and is a divisional of U.S. patent application Ser. No. 09/775,491, filed Feb. 2, 2001 now U.S. Pat. No. 6,753,638.

FIELD OF THE INVENTION

This invention relates to the field of electrostatic actuators and, in particular, to microelectromechanical (MEM) electrostatic actuators.

BACKGROUND

Prior parallel-plate actuators, such as the example illustrated in FIGS. 1A (top view), 1B (side view), and 1C (side view), are typically designed with gaps 13 that are significantly larger than the stroke range of the actuator. When a voltage is applied between two electrode plates 15 and 10, an attractive force is produced between the electrode plates that rotates plate 10. Because the maximum rotation is determined by the separation, or gap 13, between the two electrode plates 15 and 10, there must be a large separation in order to obtain a large deflection. The gap 13 needs to be much larger than absolutely necessary for the physical movement of electrode plates 15 and 10, because if the electrodes approach too closely to each other (e.g., less than about ⅓ of gap 13), a point of instability is reached where the electrodes 15 and 10 may snap together.

Because the force produced by a parallel-plate actuator is proportional to (voltage/gap)$^2$, as gap 13 increases, the voltage must also go up with the square of the distance in order to achieve the same force. With the movement of the structure, electrode plates 15 and 10 do not remain parallel to each other and gap 13 between them decreases. Hence, the voltage required to move electrode plates 15 and 10 a given distance is high, nonlinear, and constantly changing. This may require more complex electronics to control the actuator that may be difficult and costly to build. Also, the use of a large gap may result in cross-talk between adjacent actuators in an array.

Moreover, on the extremely small scale of these actuators, problems are introduced by the need to run conductors for the voltages very close together. With higher voltages, interactions between conductors are hard to avoid and in extreme cases, arcing between conductors will occur, leading to damage to the device. Current parallel plate actuators having a useful range of movement typically require voltages of 300 volts or higher.

U.S. Pat. No. 5,536,988 entitled Compound Stage MEM Actuator Suspended For Multidimensional Motion discloses the use of interlocking comb fingers as X-Y axis actuators for nested stages of MEMs devices. The levitation force produced by comb fingers can also be use to generate torsional actuators. Nevertheless, the primary limitation of comb fingers is on the stroke range. The levitation force produced by comb drives is limited to approximately the same distance that the comb fingers are spaced. This typically makes deflections greater that 5 to 10 microns (µm) very difficult. Deflections greater than 50 µm may be needed, however, for mirror actuator applications, which may not be possible to achieve with the comb finger actuators.

SUMMARY OF THE INVENTION

An apparatus and method of actuation are described. For one embodiment, the apparatus may include a stage having a surface and a first blade coupled to the stage with the first blade extending perpendicular to the surface of the stage. The apparatus may also include a frame having a surface and a second blade coupled to the frame. The stage is pivotally coupled to the frame. The second blade extends perpendicular to the surface of the frame and is parallel with the first blade.

For one embodiment the stage may be pivotally coupled to the frame by a torsional flexure. By applying a voltage difference between the first and the second blades, an electrostatically generated torque will cause the stage to rotate to an angle related to the magnitude of the voltage difference.

For another embodiment, the apparatus may include a central stage, a movable frame, and a fixed frame. The central stage may be coupled to the movable frame by a first torsional flexure, and the movable frame may be coupled to the fixed frame by a second torsional flexure, perpendicular to the first. Blade actuators may be attached to the central stage and movable frame to tilt the central stage with respect to the movable stage. Blade actuators may be attached to the movable frame and the fixed frame to tilt the movable stage with respect to the fixed stage. A mirror may be attached to the central stage.

Methods for fabricating a microelectromechanical apparatus are also described. For one embodiment, first trenches are formed in a first side of a substrate. A layer of dielectric material is formed on the first side of the substrate. The first trenches are filled with the dielectric material to provide electrical isolation. A masking layer is patterned on a second side of the substrate that is opposite to the first side of the substrate. Vias are formed on the first side of the substrate. The first side of the substrate is metallized. Second trenches are formed on the first side of the substrate to define structures. The second side of the substrate is deeply etched to form blades. Etching is performed to release the structures.

Additional features and advantages of the present invention will be apparent from the accompanying drawings and from the detailed description that follows.

BRIEF DESCRIPTION OF THE DRAWINGS

The present invention is illustrated by way of example and not by way of limitation in the figures of the accompanying drawings in which like references indicate similar elements and in which:

FIG. 3B is a perspective view illustrating actuation of the blade actuator of FIG. 3A.

FIG. 4 illustrates an alternative embodiment of a blade for an actuator.

FIG. 5B illustrates one embodiment of torsional flexures.

FIG. 5C illustrates an alternative embodiment of torsional flexures.

FIG. 9A is a cross section of a silicon wafer ready to be processed.

FIG. 9B shows a portion of the wafer with a masking layer, a photoresist layer, and an opening to the silicon surface of the wafer.

FIG. 9C shows an isolation trench formed in the silicon wafer.

FIG. 9D shows a portion of the wafer with a dielectric layer on the top surface of the silicon wafer and on the sidewalls and bottom of the isolation trench.

FIG. 9E shows the portion of the wafer after planarization of the dielectric layer.

FIG. 9F shows isolation trenches on the top of the wafer and a masking layer for blades on the bottom of the wafer.

FIG. 9G shows metallization on the top of the wafer.

FIG. 9H shows trenches on the top of the wafer.

FIG. 9I shows the blades that result from deep silicon etching.

FIG. 9J shows a base wafer bonded to the wafer containing the blades.

FIG. 9K shows the wafer after a release etch separates portions of the structure and after the attachment of the lid wafer.

FIG. 10A shows a cross section of the wafer after the blades are fabricated using deep silicon etching and after a base wafer has been fusion bonded to the wafer containing the blades.

FIG. 10B shows the wafer after a portion of the top of the wafer has been removed using polishing and after isolation trenches, vias, metal interconnects, and mirror metallization have been formed.

FIG. 10C shows trenches on the top of the wafer.

FIG. 10D shows a cross section of the wafer after a release etch separates portions of the structure.

FIG. 10E shows a glass lid attached to the wafer.

FIG. 12A shows a cross section of a silicon device wafer having a bottom that is patterned and etched to define blade masking and having a spacer wafer fusion bonded to the device wafer.

FIG. 12B shows isolation trenches, vias, interconnect metal, mirror metal, and trenches on the top of the device wafer.

FIG. 12C shows a window etched through the spacer wafer.

FIG. 12D shows blades formed using deep silicon etching and a base wafer bonded to the spacer wafer using glass frit.

FIG. 12E shows a cross section after a release etch separates structures and after a glass lid is bonded to the top of the wafer using frit glass.

FIGS. 13A through 13I show perspective views of the process flow of forming two parallel cantilevered beams.

DETAILED DESCRIPTION

The method and apparatus described herein may be used to provide decoupled rotation of structures about different pivot points. For one embodiment, the apparatus may include one or more fixed blades mounted to a frame or substrate, one or more movable blades mounted to each structure to be moved, and flexures on which the structures are suspended. Separate movable blades are provided for each degree of freedom.

When voltage is applied between the fixed and movable blades, electrostatic attraction generates a force attracting movable blades toward blades that are fixed relative to the movable blades. The electrostatic attraction causes the structure to which the movable blade is mounted to rotate about the flexures. The angle of rotation that results may be related to the size of the blades, the number of blades, the spacing between blades, the stiffness of the flexures, and the magnitude of the voltage difference applied to the blades.

Methods of fabricating a microelectromechanical apparatus are also described herein. The methods include the use of deep silicon etching to form blades.

Figure 2A:
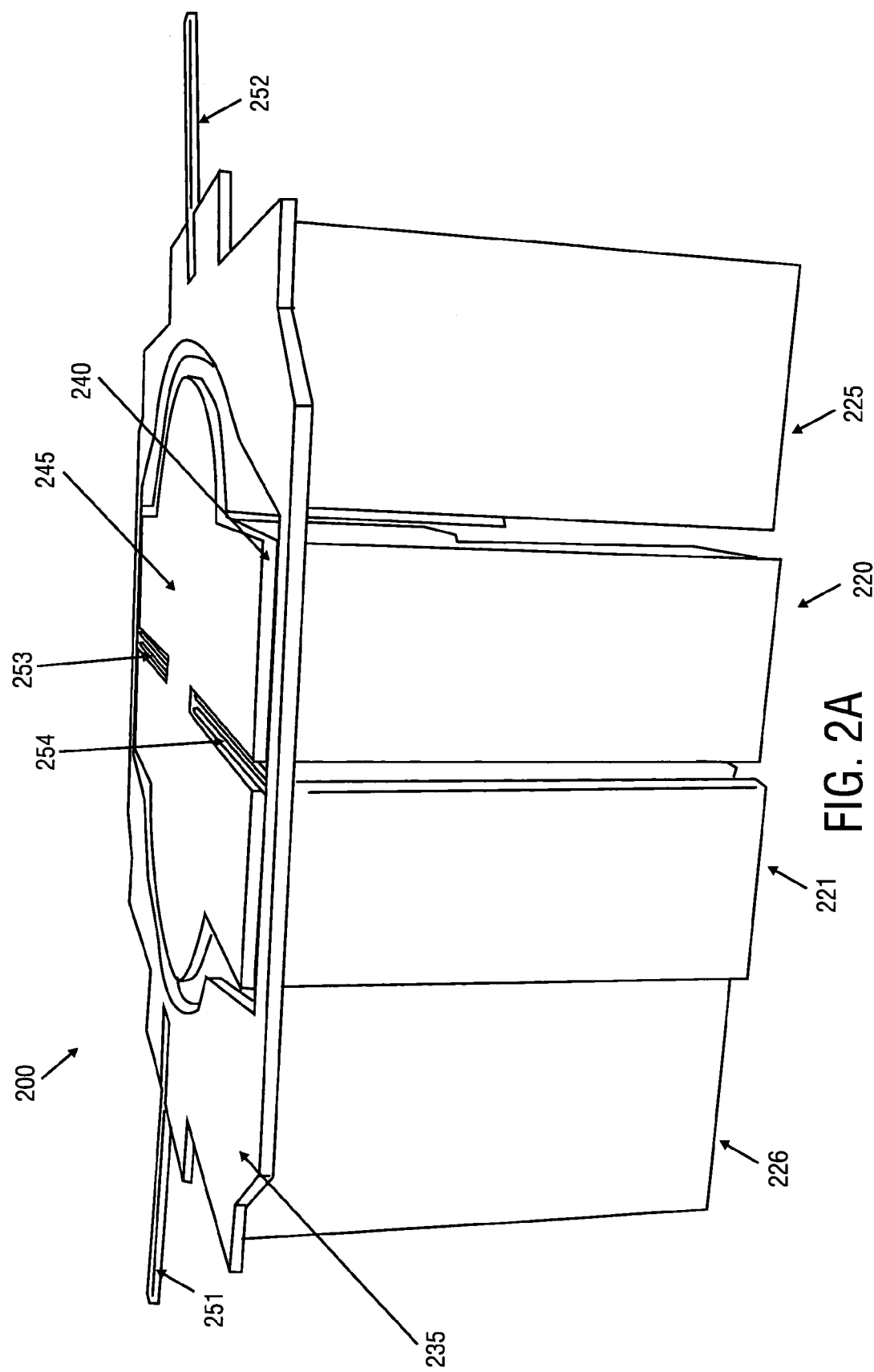
FIG. 2A illustrates one embodiment of an actuator with a stage parallel to a frame.
Figure 2B:
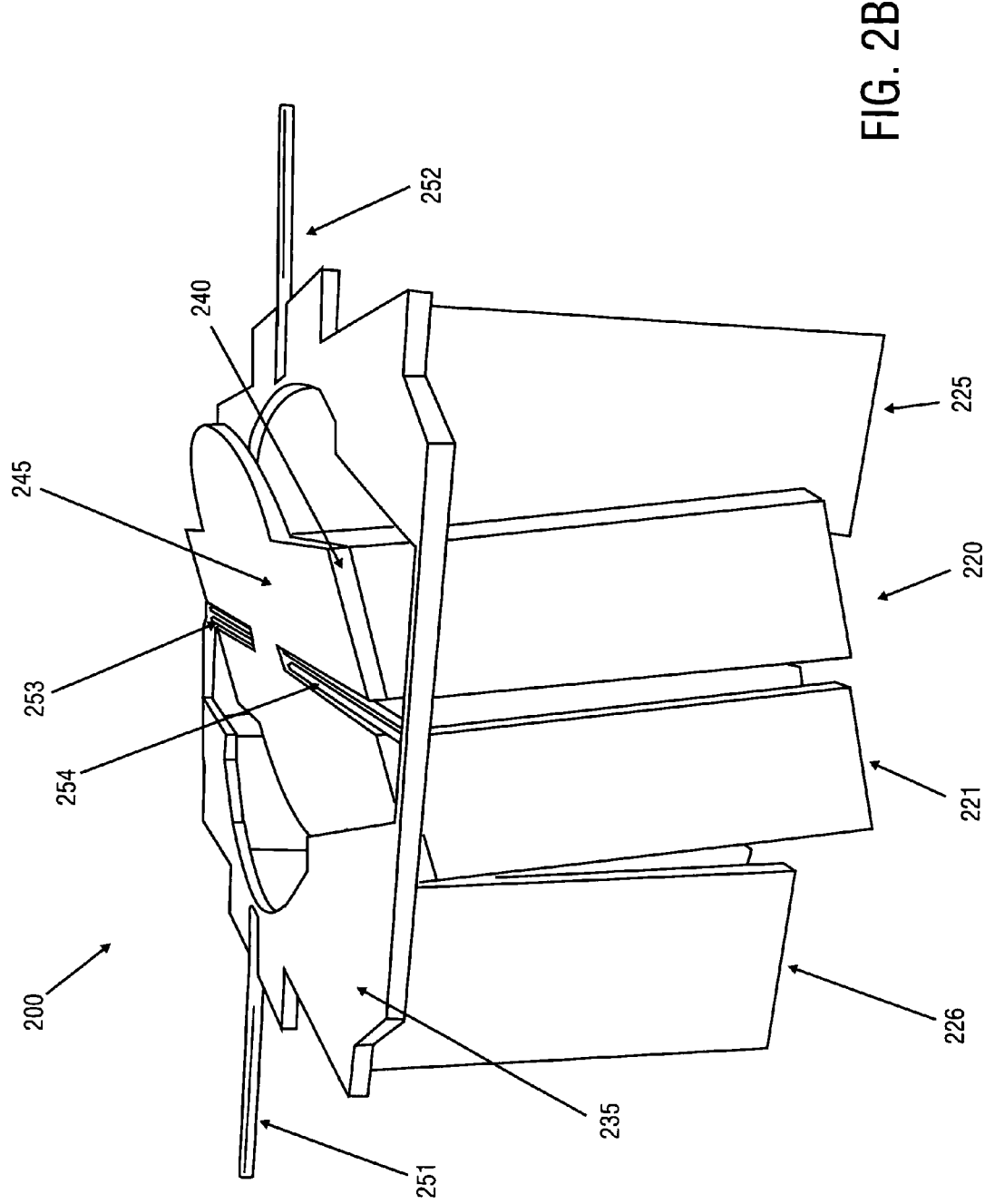
FIG. 2B shows the actuator of FIG. 2A with the stage tilted with respect to the frame.

FIGS. 2A and 2B illustrate one embodiment of an actuator. For one embodiment, actuator 200 includes a stage 240 and a frame 235. FIG. 2A shows the stage 240 parallel to the frame 235. FIG. 2B shows the stage 240 tilted with respect to the frame 235. Stage 240 may have a reflective element 245, such as a mirror, disposed on its top surface. Stage 240 is pivotally coupled to frame 235 using flexures 253 and 254 on diametrically opposed sides of stage 240. Flexures 253 and 254 suspend stage 240 in a cavity formed by frame 235 such that stage 240 is free to pivot around a rotational axis formed by flexures 253 and 254. Stage 240 and frame 235 each have one or more blades (e.g., blades 220 and 225, respectively) coupled to and extending from them. For example, blade 220 is coupled to stage 240 and blade 225 is coupled to frame 235. By applying a voltage difference between blades 220 and 225, stage 240 may be pivoted.

Similarly, frame 235 may be pivotally coupled to an outer stationary frame (not shown) using flexures 251 and 252 on diametrically opposed sides of frame 235. The outer frame may be a stationary frame or, alternatively, may be also be designed to move relative to yet another outer frame structure. Flexures 251 and 252 suspend frame 235 in a cavity formed by the outer frame such that frame 235 is free to pivot around a rotational axis formed by flexures 251 and 252. Flexures 251 and 252 are orthogonal to flexures 253 and 254, thereby enabling a reflective element coupled to stage 240 to be pivoted in two dimensions (e.g., rolled and pitched).

A blade is defined as a rigid object having any one of various shapes. For example, a blade may be a polyhedron as illustrated in FIGS. 2A and 2B. Alternatively, blades may have other three dimensional polygonal shapes, for example, cubic and trapezoidal. A blade may either be a solid or hollow object.

Blade 220 extends in a direction perpendicular to the undersurface of stage 240 and blade 225 extends in a direction perpendicular to the undersurface of frame 235. An electric potential applied between blades 220 and 225 may cause an attraction between the blades. Because blade 220 is coupled to stage 240, an attraction of blade 220 towards blade 225 causes stage 240 to pivot about the rotational axis formed by flexures 253 and 254. For example, stage 240, and the corresponding blades coupled to the stage 240, may be pivoted such that the surface of stage 240 lies at an angle relative to the surface of frame 235 as shown by the position illustrated in FIG. 2B. The operation of blades is discussed below in relation to FIGS. 3A and 3B.

Figure 3A:
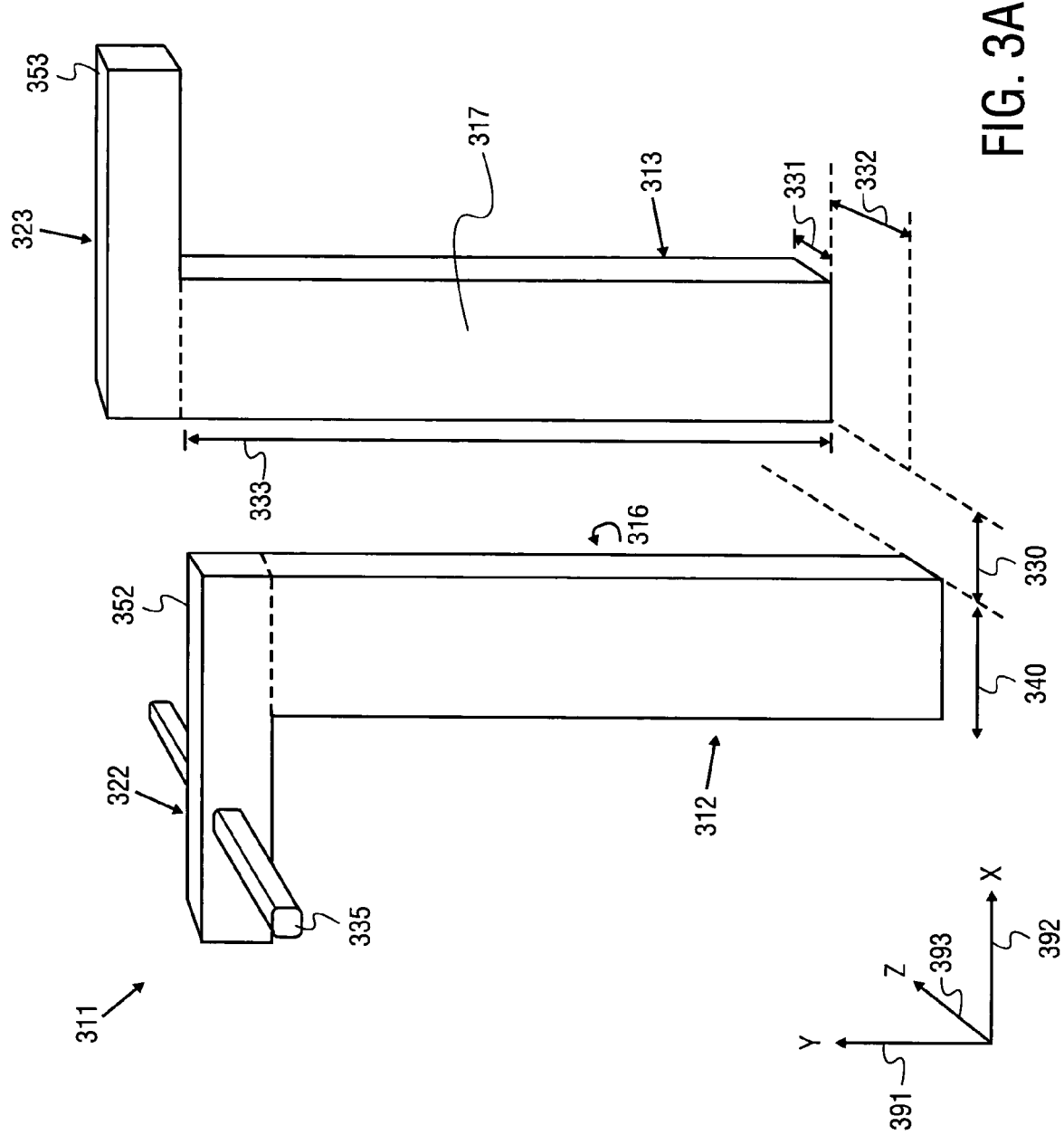
FIG. 3A is a perspective view illustrating one embodiment of a blade actuator.

FIG. 3A is a perspective view illustrating one embodiment of a blade actuator. Blade actuator 311 includes a blade 312 that is part of a structure 322 to be actuated. For one embodiment, for example, structure 322 may be a segment of stage 240 where blade 220 of FIGS. 2A and 2B is attached. Structure 322 may be constrained from vertical or lateral motion but remains free to pivot on a torsional flexure 335. For one embodiment, flexure 335 is rectangularly shaped. Alternatively, flexure 335 can be any other shape that provides rotational compliance and that can be fabricated with integrated circuit fabrication techniques, for example. The rotation of structure 322 allows for blade 312 to rotate within the X-Y plane (392, 391). By the design of flexure 335, the motion of blade 312 is constrained in the Z-direction (into/out of the page) 393.

Actuator 311 also includes blade 313 that is part of structure 323. For one embodiment, blade 313 corresponds to blade 225 of FIGS. 2A and 2B and blade 312 corresponds to blade 220 of FIGS. 2A and 2B. Blade 313 can, for example, be attached to frame 235 and blade 312 can be attached to stage 240. Given that blade 312 rotates within the X-Y plane (391, 392) relative to blade 313, blade 312 is referred to as a movable blade and blade 313 is referred to as a fixed blade.

Blades 312 and 313 may be configured as electrodes having electric charges to generate an electrostatic field between them. An electrostatic field forms around any single object that is electrically charged with respect to its environment. An object is negatively charged (−) if it has an excess of electrons to its surroundings. An object is positively charged (+) if it is deficient in electrons with respect to its surroundings. Objects attract if their charges are of opposite polarity (+/−) and repel if their charges are of the same polarity (+/+ or −/−).

An electrostatic field also arises from a potential difference, or voltage gradient, that exits when charge carriers, such as electrons, are stationary (hence the "static" in "electrostatic"). When two objects (e.g., blades 312 and 313) in each other's vicinity have different electric charges, an electrostatic field exists between them. As such, when a voltage is applied between blades 312 and 313, an attractive force is produced between them. The attractive force between blades 312 and 313 is proportional to the square of the voltage potential between them.

When there is no voltage potential between blades 312 and 313, the surface 352 of structure 322 is substantially parallel with the surface 353 of structure 323 and blade 312 is separated from blade 313 a distance 330 in X direction 392. The distance 330 can either positive or negative—i.e., the blades 312 and 313 can either be overlapping or non-overlapping. As a voltage potential is applied between blades 312 and 313, the movable blade 312 is attracted toward fixed blade 313 and structure 322 pivots about flexure 335. The greater the height 333 of blades 312 and 313, the greater the torque that is generated on structure 322. The generation of a greater torque decreases the amount of voltage required to pivot structure 322. Because structure 322 (to which blade 312 is coupled) is constrained to pivot on rotational axis 335, movable blade 312 moves in Y direction 391 and moves towards fixed blade 313 in X direction 392 until surface areas of blades 312 and 313 overlap, as illustrated in FIG. 3B.

Because the blade 312 can rotate about an axis 335 which may be in the form of a torsional spring such as 254, it is convenient to view of the force of attraction between blades 312 and 313 as being a torque. This torque that acts on blade 312 as a result of applying a voltage difference between blades 312 and 313 is approximately proportional to the height 333 of the blades squared and inversely proportional to the gap 332 as shown in the equation below.

$$\text{torque} = \frac{1}{2} \frac{\varepsilon_o \, \text{height}^2 \text{voltage}^2}{\text{gap}} \qquad \text{(Equation 1)}$$

Figure 3C:
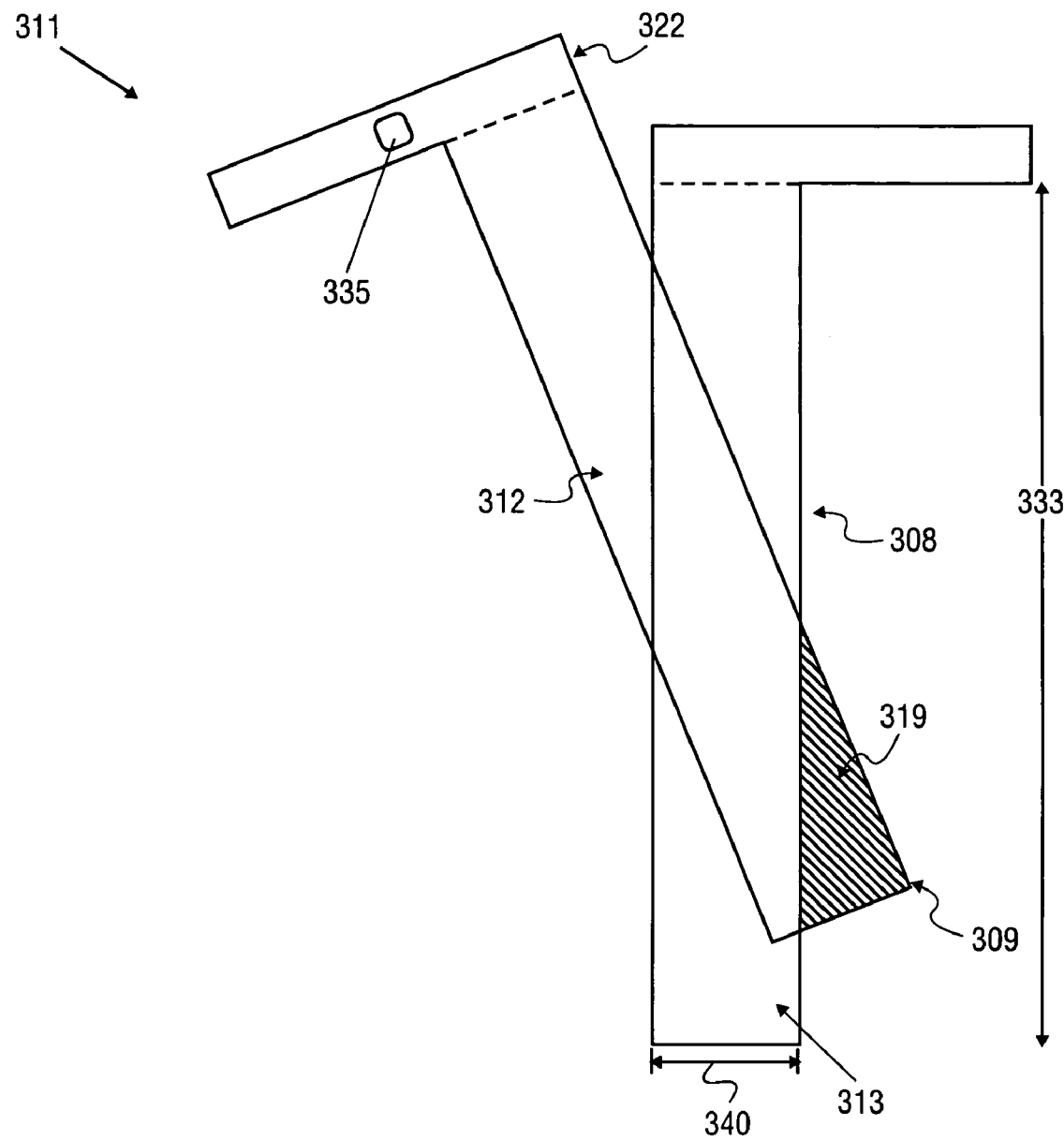
FIG. 3C is a side view illustrating the actuation of the blade actuator of FIG. 3A.

As shown in FIG. 3C, for one embodiment, based on length 340 and height 333, a portion 319 of blade 312 may no longer overlap blade 313 towards the end of the blade 312's stroke range. As the leading tip 309 of blade 312 moves past the edge 308 of blade 313, the torque may taper off. As such, for a given height 333, the stroke range may be primarily determined by the length 340 of blades 312 and 313.

For one embodiment, blades 312 and 313 have a length 340 and a height 333 each on the order of hundreds of microns and widths 331 on the order of tens of microns. For one embodiment, for example, a structure may be rotated an angle (θ) that may be greater than 20 degrees relative to the structure's resting position.

For an alternative embodiment, blades 312 and 313 may have different lengths, heights, and widths, which may also be different with respect to each other.

The overlap between blades 312 and 313 and the geometric shape of the leading edge of the blade are important factors with respect to force profile over the deflection angle.

Figure 1A:
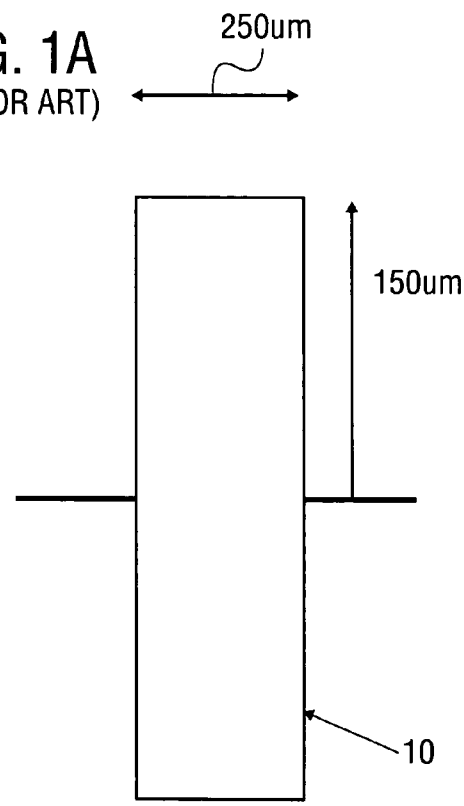
FIG. 1A is a top view illustrating a prior art pivoting structure that uses parallel plate actuation.
Figure 1B:
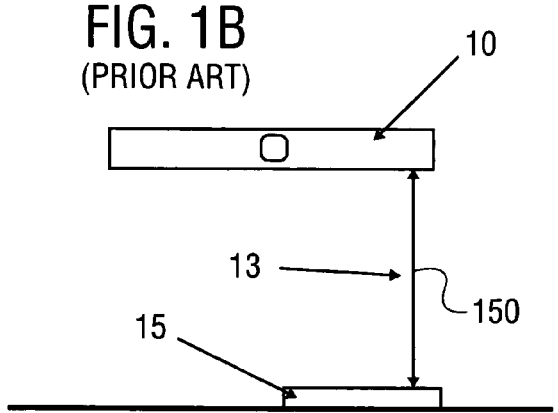
FIG. 1B is a side view illustrating the prior art parallel plate actuation structure of FIG. 1A.
Figure 1C:
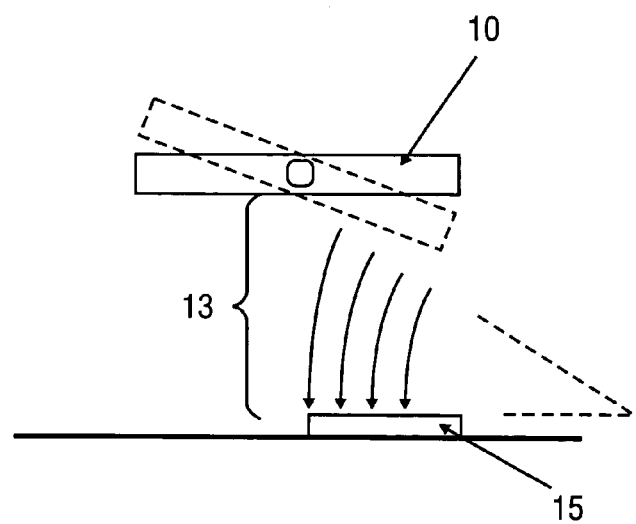
FIG. 1C is a side view illustrating the parallel plate actuation structure of FIG. 1B with an electrostatic plate activated.

Because movable blade 312 is constrained from motion in Z direction 393, the distance 332 between blades 312 and 313 remains substantially constant along the stroke range of blade 312. As shown in equation 1 set forth above, the torque produced between blades 312 and 313 is proportional to 1/gap. Because the gap remains substantially constant along the stroke range of blade 312, the torque also remains substantially constant for a given voltage. The gap 332 between the blades can be substantially smaller than the gaps used in the prior art—for example, gap 13 of FIGS. 1B and 1C is 150 microns. Gap 332 of FIG. 3A is typically on the order of five to twenty microns. The net result of having a small and constant gap is that high forces and therefore high torques are produced over the entire stroke range of blade 312. In this manner, a larger deflection angle of blade 312 may be achieved with a lower voltage than previously required with prior actuators. As an example, approximately ⅓ less voltage may be used to control the actuation of stage 240 of FIGS. 2A and 2B. For one embodiment, for example, the actuation voltage may be on the order of 100 volts.

Figure 3D:
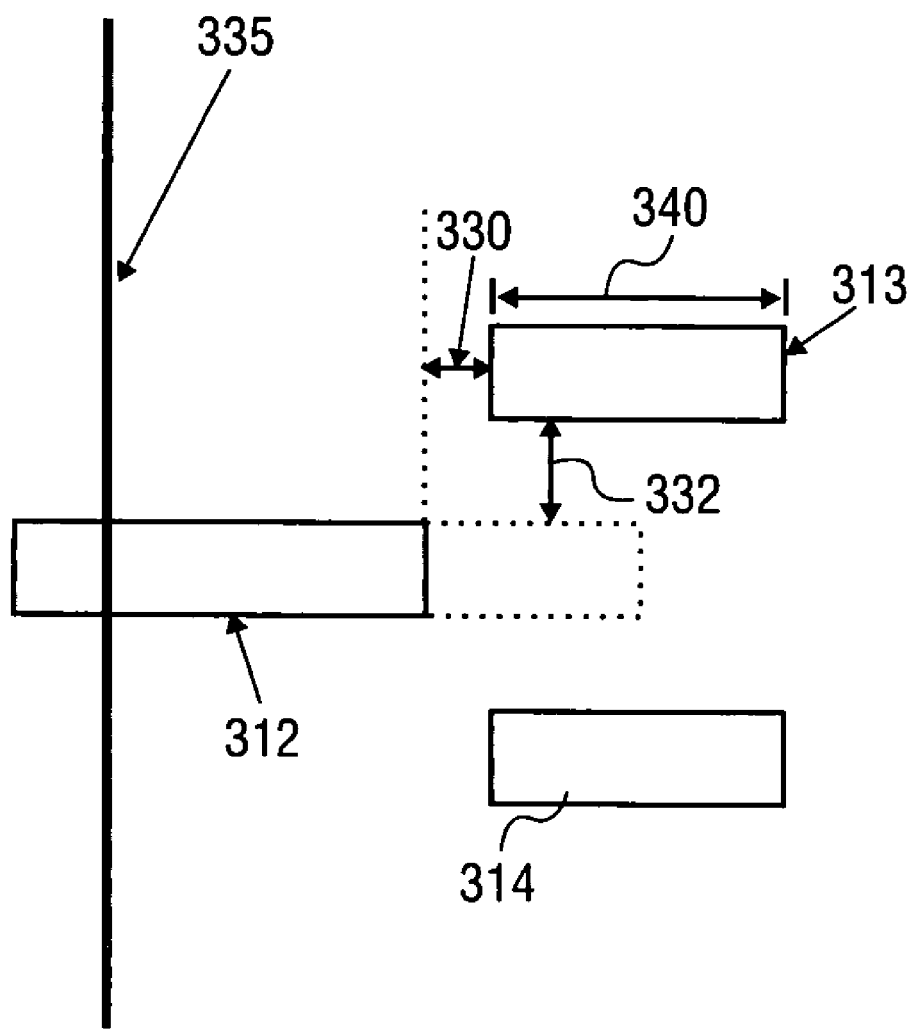
FIG. 3D is a top view illustrating an alternative embodiment of a blade actuator.

FIG. 3D is a top view of an alternative embodiment of an actuator where an additional fixed blade 314 may be used to further increase the attraction force on movable blade 312 and, thereby, reduce the voltage necessary for blade actuation.

Figure 3E:
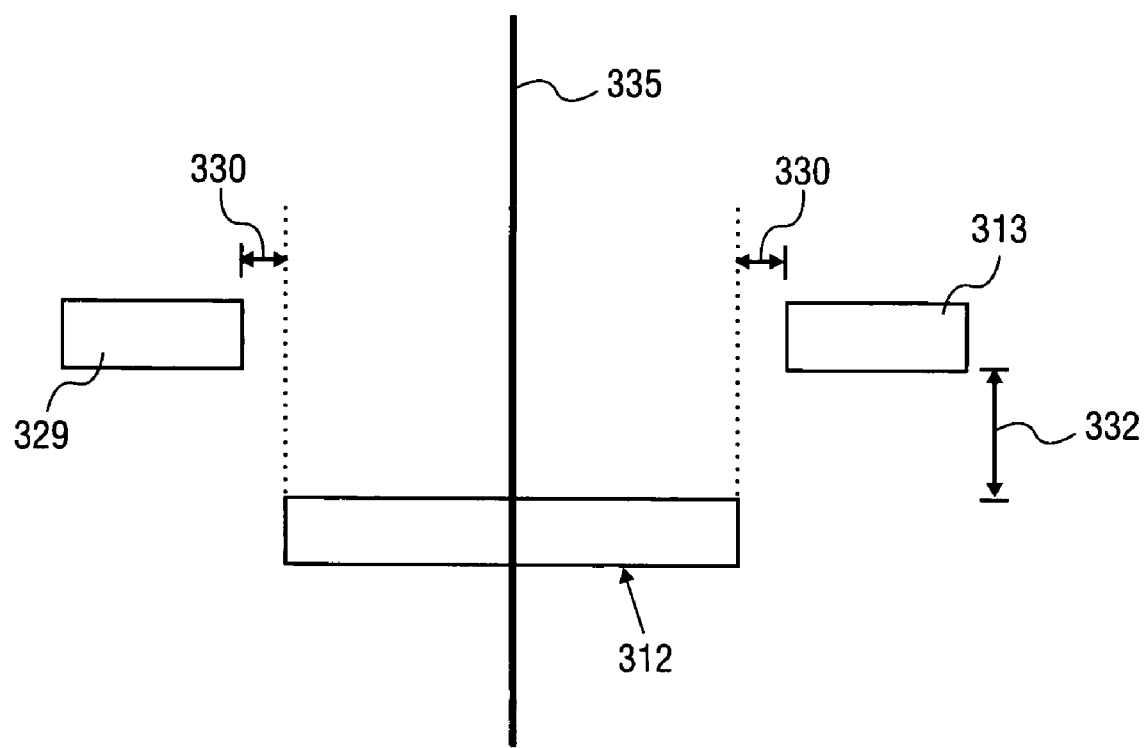
FIG. 3E is a top view illustrating another embodiment of a blade actuator.

As shown in FIG. 3E, an additional fixed blade 329 may also be placed on the other side of movable blade 312 to rotate blade 312 in both directions. Alternatively, an additional movable blade 221 may be used in conjunction with additional fixed blade 226, as illustrated in FIGS. 2A and 2B. In this manner, there is one fixed blade and one movable blade for each direction of motion.

FIG. 4 illustrates an alternative embodiment of blade for an actuator. In one embodiment, either of blades 412 and 413 may be tapered along their lengths (e.g., length 440 of blade 412). In this configuration, the effective separation 432 between blades 412 and 413 decreases as the surface areas of the blades along their lengths overlap one another, thereby resulting in an increasing level of force with the increasing deflection of blade 412. As discussed above, an increase in force means that a lower voltage is required to maintain the attraction between blades 412 and 413. In addition, the tapering of movable blade 412 may improve the off-axis (i.e., Z direction 393 of FIGS. 3A and 3B) instability of the blade. The edges of the blades may also be shaped to control the initiation performance of blade 412 as it first starts to move in X direction 492.

Figure 5A:
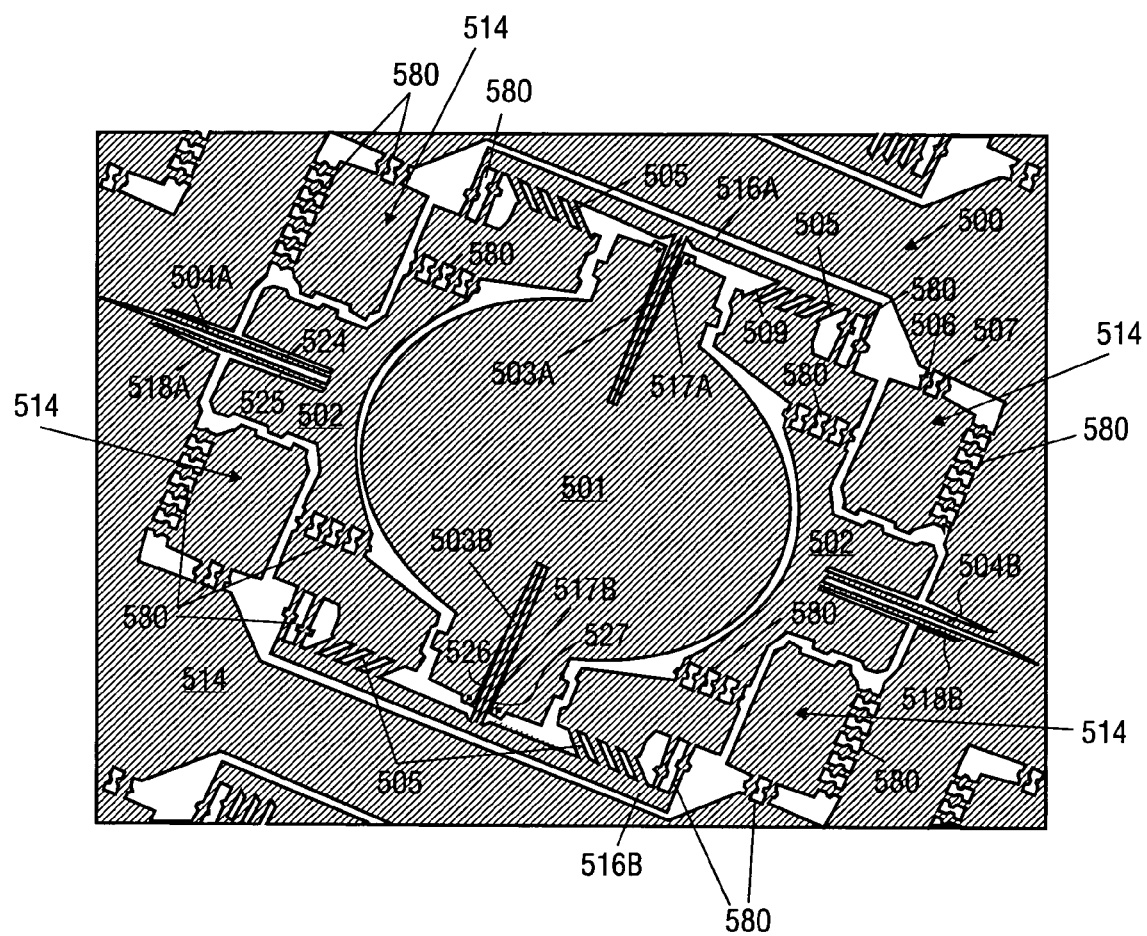
FIG. 5A is a top view illustrating one embodiment of a multiple stage actuator.

FIG. 5A is a top view showing one embodiment of a multiple stage actuator. For one embodiment, actuator 500 includes a central stage 501, a movable frame 502, and a stationary frame 514. Stationary frame 514 forms a cavity in which stage 501 and movable frame 502 are disposed. A reflective element (e.g., a mirror) may be coupled to stage 501 and suspended from movable frame 502 by a pair of flexures 503a and 503b. The reflective element may be used to redirect a light beam along an optical path different from the optical path of the received light beam. An actuator 500 that includes a mirror on stage 501 is also referred to as a mirror cell or a MEM actuator with a mirror.

For one embodiment, the rotation of stage 501 is independent of the rotation of movable frame 502. Actuator 500 thus allows decoupled motion. For example, stage 501 can rotate with respect to frame 502 while frame 502 remains parallel and stationary with respect to frame 514. In addition, movable frame 502 can rotate with respect to stationary frame 514 while stage 501 remains parallel (and stationary) with respect to movable frame 502. Furthermore, stage 501 and movable frame 502 can, for example, both rotate concurrently yet independently of each other. Thus, for example, stage 501, movable frame 502, and stationary frame 514 can concurrently be non-parallel and decoupled with respect to each other during actuation.

Flexures 503a and 503b are coupled to movable frame 502 via end bars 516a and 516b, respectively. End bars 516a and 516b are, in turn, attached to the main body of movable frame 502 using multiple support members 505. Support members 505 are silicon dioxide beams providing a tensioning force. The support members 505 provide a tensioning force by expanding a different amount than the material system used in fabricate frame 502, stage 501, end bars 516a and 516b, and stationary frame 514. The concept is to place material systems of differing expansion into the movable frame 502 in order to put the flexures 503a, 503b, 504a, and 504b into tension. In particular, the expansion provided by members 505 acting against frame 502 and end bars 516a and 516b causes a tensioning force on each of flexures 503a, 503b, 504a, and 504b. Support members 505 serve to apply a tension force in order to minimize the potential for positional distortions due to buckling of the flexures under compressive forces. Generally, if flexures 503a, 503b, 504a, and 504b are under too great a compressive force, flexures 503a, 503b, 504a, and 504b may buckle. As such, support members 505 may be coupled between the main body of movable frame 502 and end bars 516a and 516b at a non-perpendicular angle 509 in order to pull on flexures 503a and 503b to place them in tension. Because flexures 504a and 504b are perpendicular to flexures 503a and 503b, the non-perpendicular angle 509 of attachment of support members 505 causes a pull on the main body of movable frame 502 and, thereby, a pull on and a tensioning of flexures 504a and 504b.

For one embodiment, for example, support members 505 may be coupled between the main body of movable frame 502 and end bars 516a and 516b at approximately a 45 degree angle. In an alternative embodiment, support members 505 may be coupled between the main body of movable frame 502 and end bars 516a and 516b at an angle less than or greater than 45 degrees.

Flexures 503a and 503b allow central stage 501 to pivot. Flexures 503a and 503b provide some torsional resistance proportional to the rotation angle, but substantially less resistance than all other directions. In other words, there is substantial resistance to undesired twisting movement of central stage 501 in other directions (e.g., side-to-side, or around an axis perpendicular to the surface of central stage 501). Flexures 503a and 503b extend into slots 517a and 517b, respectively, formed into central stage 501 in order to provide sufficient length to the flexures for appropriate flexibility and torsion resistance. In one embodiment, for example, flexures 503a and 503b may have a length of approximately 100 microns, a height of approximately 10 microns, and a width of approximately 1 micron, resulting in a 10:1 aspect ratio. Such an aspect ratio may provide for greater compliance in the direction of desired motion and stiffness in the undesired directions. In an alternative embodiment, other lengths, heights, widths, and aspect ratios may be used.

Similarly, flexures 504a and 504b enable movable frame 502 to pivot while providing resistance to undesired twisting movement of movable frame 502 in other directions (e.g., side-to-side, or around an axis perpendicular to the surface of movable frame 502). Flexures 504a and 504b extend into slots 518a and 518b, respectively, formed into movable frame 502 and stationary frame 514 in order to provide sufficient length to the flexures for appropriate flexibility and torsion resistance.

For one embodiment, one or more of flexures 503a, 503b, 504a, and 504b may comprise a pair of torsion beams. The use of multiple torsion beams may provide for increased resistance to undesired twisting movement of a frame or stage, as compared to a single beam flexure. A pair of torsion beams may have various configurations. For example, a pair of torsion beams may have the configuration of torsion beams 524 and 525 as illustrated in the close-up view of FIG. 5B. Torsion beams 524 and 525 may be non-parallel beams whose ends near movable frame 502 are substantially parallel and spaced apart by a gap 528. Gap 528 between torsion beams 524 and 525 reduces along the length of the beams such that the ends of the beams near fixed frame 514 are closer together than the ends of the beams near movable frame 502. The angling of torsion beams 524 and 525 relative to each other may aid flexure 504a to resist unstable twisting modes. In an alternative embodiment, torsion beams 524 and 525 may be configured such that their ends near fixed frame 514 are farther apart than their ends near movable frame 502. In yet another embodiment, torsion beams 524 and 525 may be substantially parallel to each other such that gap 528 is substantially uniform along the length of the beams.

Alternatively, as shown in FIG. 5C, flexure 503*b* may comprises a pair of torsion beams as shown by torsion beams 526 and 527. Torsion beams 526 and 527 are substantially parallel beams spaced apart by gap 529. Gap 529 between torsion beams 526 and 527 remains substantially constant along the length of beams 526 and 527. The parallel torsion beams 526 and 527 may operate to enhance the mechanical stability of central stage 501. In an alternative embodiment, torsion beams 526 and 527 may be configured such that their ends near central stage 501 are closer together than their ends near end bar 516*b*. For yet another embodiment, torsion beams 526 and 527 may be configured such that their ends near end bar 516*b* are closer together than their ends near central stage 501.

Figure 6:
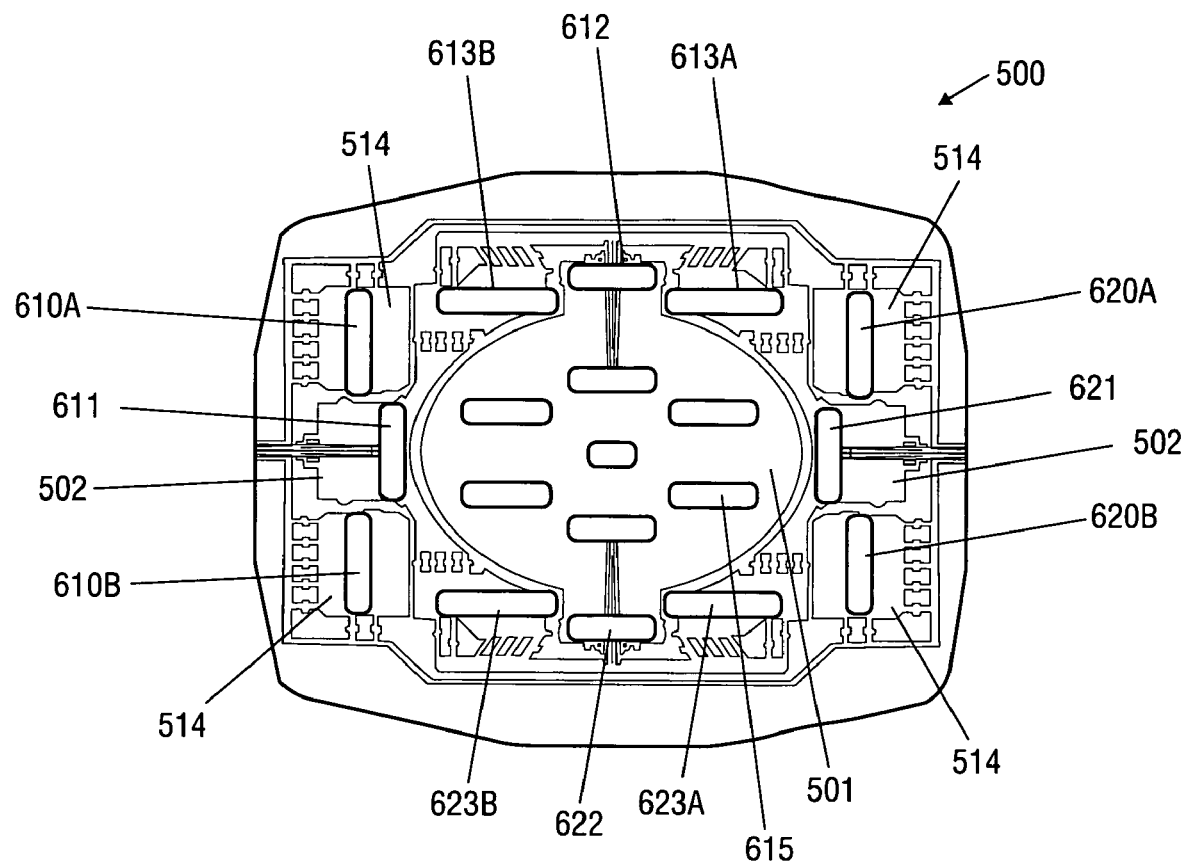
FIG. 6 illustrates one embodiment of the underside of the multiple stage actuator 500 of FIG. 5A.

FIG. 6 illustrates one embodiment of the underside of the multiple stage actuator 500 of FIG. 5A. For the embodiment illustrated in FIG. 6, at each end of a stage or frame, actuator 500 uses a single movable blade with two corresponding fixed blades as an actuation mechanism structure to enable rotation. Actuator 500 uses two such actuation mechanism structures per stage and two such actuation mechanism structures per frame.

In the illustrated embodiment, blade 612 is coupled to stage 501 and blades 613*a* and 613*b* are coupled to frame 502 on opposite ends of blade 612. Stage 501 is pivotally coupled to frame 502 such that blade 612 is configured to move relative to blades 613*a* and 613*b*. When a potential difference is applied between blade 612 and one of blades 613*a* and 613*b*, an attraction is generated between the blades causing stage 501 to pivot. For example, blade 612 may be held at a ground potential while an active voltage is applied to either of blades 613*a* and 613*b*. The application of an active voltage to blade 613*a* will attract blade 612 (as discussed above in relation to FIGS. 3A and 3B), thereby causing stage 501 to rotate in a corresponding direction. Similarly, the application of an active voltage to blade 613*b* will attract blade 612 and cause stage 501 to rotate in an opposite direction to that resulting from the attraction to blade 613*a*.

Blade 622 is coupled on the opposite end of stage 501, with blades 623*a* and 623*b* coupled to frame 502 on opposite ends of blade 622. Blade 622 moves relative to blades 623*a* and 623*b*. In order to provide the desired motion of stage 501 and to resist unwanted rotations, actuation voltages are applied concurrently with respect to blades 612 and 622. When the potential difference is applied between blade 622 and one of blades 623*a* and 623*b*, an attraction is generated between the blades resulting in the rotation of stage 501 in a manner similar to that discussed above. The use of actuation mechanisms in tandem on each end of stage 501 minimizes undesired twisting of the stage 501 to provide for more uniform rotation.

A similar actuation mechanism structure may be used for rotation of frame 502. For example, blade 611 is coupled to movable frame 502 and blades 610*a* and 610*b* are coupled to stationary frame 514 on opposite ends of blade 611. Frame 502 is pivotally coupled to frame 514, as discussed above, such that blade 611 is configured to move relative to blades 610*a* and 610*b*. When a potential difference is applied between blade 611 and one of blades 610*a* and 610*b*, an attraction is generated between the blades causing frame 502 to pivot in a manner similar to that discussed above in relation to stage 501.

Blade 621 is coupled on the opposite end of frame 502, with blades 620*a* and 620*b* coupled to frame 514 on opposite ends of blade 621. Blade 621 moves relative to blades 620*a* and 610*b*. When the potential difference is applied between blade 621 and one of blades 620*a* and 620*b*, an attraction is generated between the blades facilitating the rotation of frame 502. The use of actuation mechanisms in tandem on each end of frame 502 minimizes undesired twisting of the frame to provide for more uniform rotation.

Alternatively, a stage or frame may only have an actuation mechanism structure on only a single end. For another embodiment, actuator 500 may have other actuation mechanism structures as discussed above in relation to FIGS. 2A to 4.

For one embodiment, additional elongated members (e.g., elongated member 615) may be coupled to the undersurface of stage 501 to stiffen stage 501 and minimize top surface distortions. In addition, blades 615 on stage 501 may be used to remove etch depth variations across the device. Elongated member 615 may be constructed similar to that of blades discussed above in relation to FIGS. 2A and 2B.

Because the actuation mechanism of actuator 500 is located entirely beneath the stage to be rotated, none of the top surface areas of stage 501 need be taken up by the actuation mechanism.

Figure 7A:
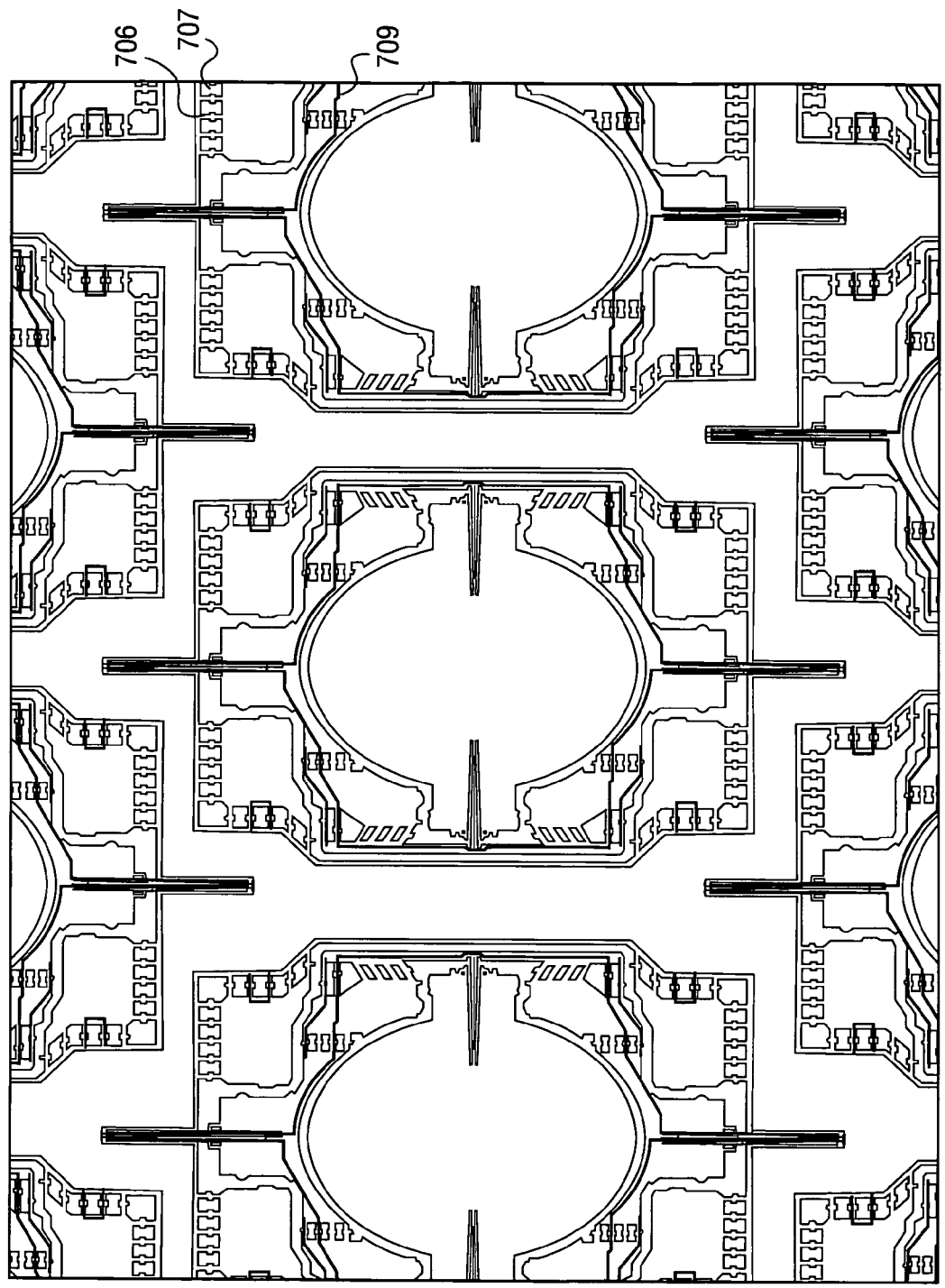
FIG. 7A illustrates one embodiment of an actuator array.

For one embodiment, actuator 500 may be fabricated on a wafer level using semiconductor fabrication techniques, as discussed below. For such an embodiment, frame 514 may be formed from a substrate, for example, constructed from silicon. Where all blades are directly driven by different control voltages, actuator 500 may use four voltages, plus a ground, for the configuration illustrated in FIG. 6. With this arrangement, the number of conductive paths on a substrate quickly becomes very large as multiple actuators are combined to form an array, as illustrated in FIG. 7A. The low voltages required by the blade actuators discussed above may allow for control circuitry to be fabricated into the substrate so that only control signals need be routed, rather than separate lines for each blade. This results in a significant reduction in lead count. Lower voltages may also reduce the necessity for spacing between leads to avoid arcing and cross-talk.

Figure 7B:
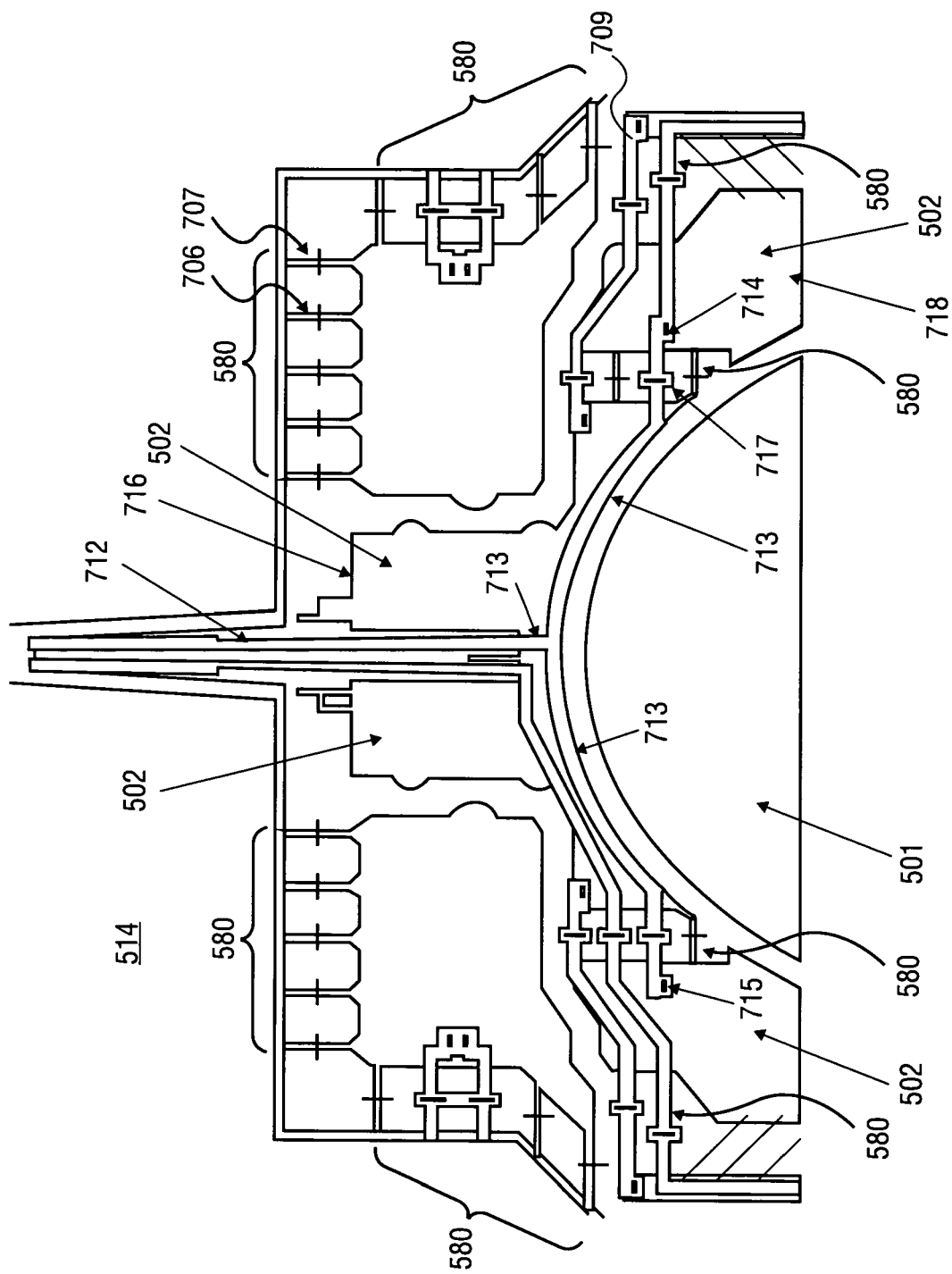
FIG. 7B illustrates one embodiment of interconnect metallizations.

For one embodiment, transistors may be used to address mirrored stages individually, for example, using a row-column addressing scheme. This may significantly reduce the number of metal traces (e.g., trace 709) necessary to operate array 700. Interconnect metallization on the top surface of actuator array 700 may be used to route voltages over flexures to different blades (not shown) on the underside of array 700, as illustrated in FIG. 7B. In one embodiment, metallization may be used to form mirrors on the respective actuator stages resulting in a plurality of mirror cells.

FIG. 7B shows an example of how electrical contact can be made to the blade actuators. For example, flexure 712 is a movable frame flexure similar to torsion beam 525. Along the top surface of flexure 712 is a metal layer 713 that eventually runs over a portion of movable frame 502. This metal layer 713 runs over isolation joint 717 and connects to an isolated region 718 of movable frame 502 at via 714. Under this isolated region 718 is a blade used to tilt the central stage 501. A similar connection is made on the other side of the frame 502 at via 715.

Flexure 712 also is made primarily of highly doped silicon. This silicon within flexure 712 conducts electricity between the fixed stage 514 and the portion of the movable frame generally indicated by 716. Under the movable frame generally indicated by 716 is a movable frame blade used to tilt the movable frame. Other alternative electrical routing schemes are possible by including additional isolation joints or additional torsional beams.

Isolation segments (e.g., isolation segments 706 and 707) may be used to separate potentials for different sections of the substrate. Isolation segments 706 and 707 are electrical barriers made of silicon dioxide (a dielectric) that reside midway within the structural silicon beams 580 shown in FIGS. 7B and 5A. Each of beams 580 includes isolation segments that serve to electrically isolate sections of the frame 502 from one another. Each electrical isolation segment extends beyond the width and depth of respective structural beams 580 in order to completely break any potential conduction path. Support members 505 also provide such electrical isolation given that they are comprised solely of silicon dioxide, which is a dielectric. Such electrical isolation is necessary to allow separate electrical potentials to be applied to respective blades in order to create potential voltage differences between blades to trigger actuation. Without such isolation segments, continuous conduction paths within the silicon would short the actuation potentials between the blades.

For one embodiment, electrodes for each mirror may be routed on the top surface of array 700 of FIG. 7A using standard techniques known in the art. In an alternative embodiment, electrodes may be routed directly to the backside of a wafer using through-wafer vias to increase packing density.

Figure 8:
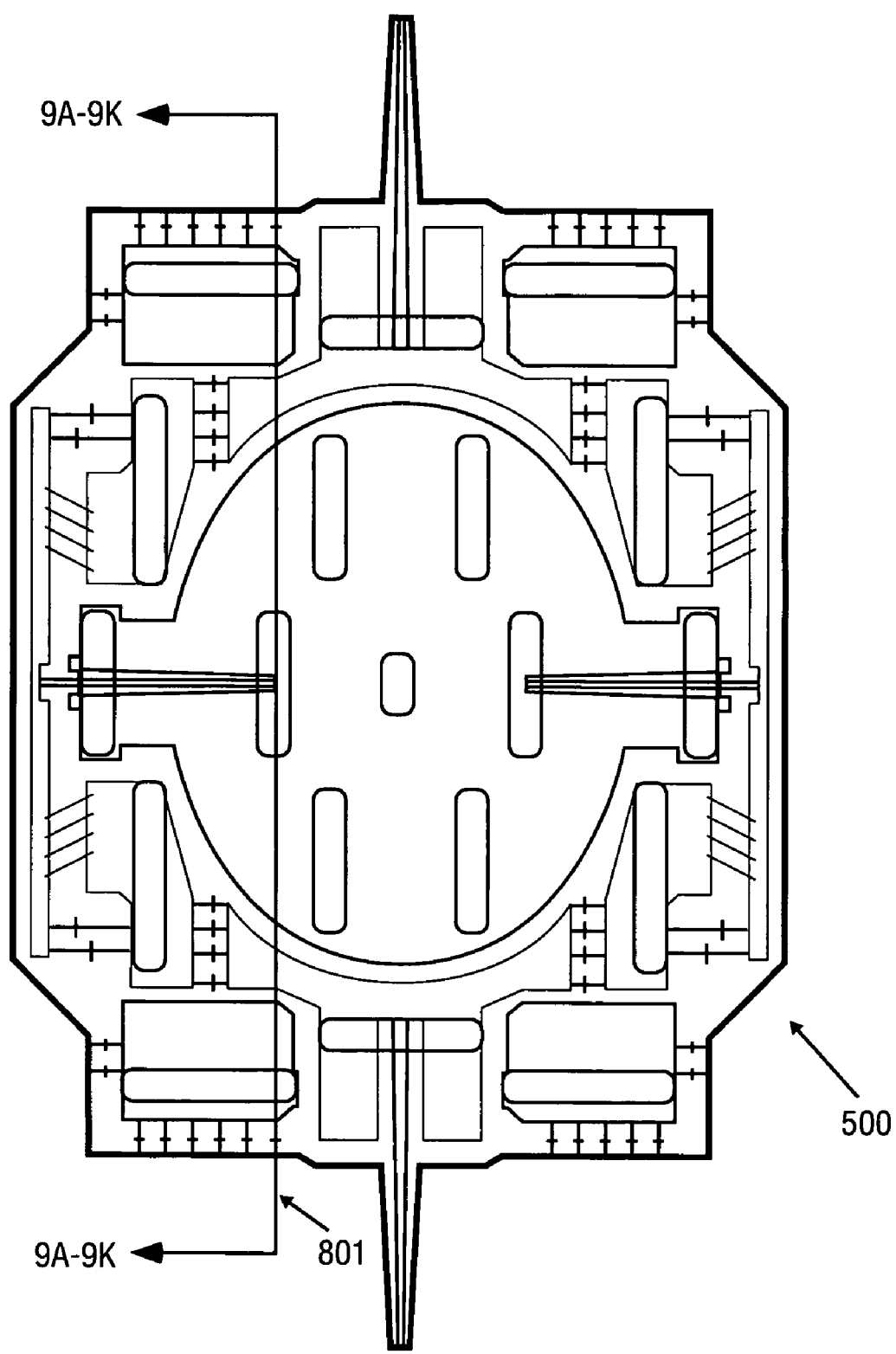
FIG. 8 illustrates a mirror cell.

A number of techniques may be used to fabricate mirror cell 500 shown in FIG. 8. The techniques discussed with respect to FIGS. 9A-9K are associated with the view provided by cross-section line 801 shown in FIG. 8. The fabrication methods of embodiments of the invention result in a mirror platform suspended by cantilevered silicon beams. Electrical isolation between sections of the mirror or between different blades is achieved through the use of integral isolation segments, which serve to mechanically connect but electrically isolate separate elements of the mirror.

A major design parameter for the mirror actuator is the depth of the blades, measured perpendicular to the axis of rotation. Increasing the blade depth results in increased force, but requires more swing space to rotate through high angles. Shallower blades more easily accommodate higher deflections but usually require a greater number of blades in order to achieve the same force. Therefore, it is advantageous to have several blade depths available to the designer. Different blade depths require multiple approaches to the fabrication process, which are described herein.

Figure 9A:
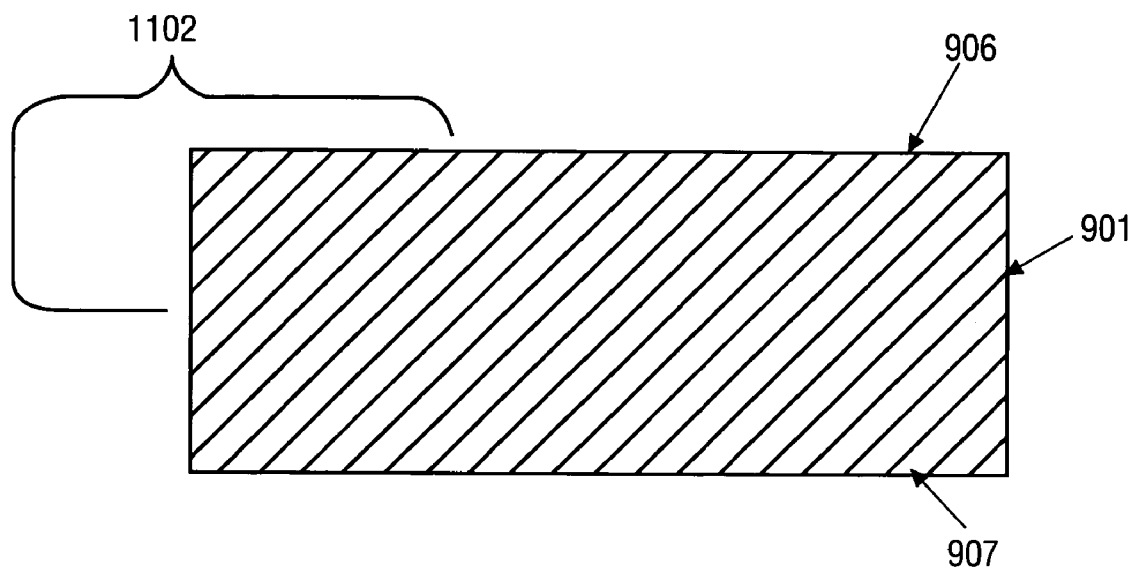
FIGS. 9A through 9K show cross sections associated with one method of fabricating a mirror cell.

One embodiment of the invention uses a single device wafer and the associated method is set forth with reference to FIGS. 9A-9K. FIG. 9A shows a silicon wafer 901 that is chosen to be in the thickness range of 300-600 micrometers (um). The silicon wafer 901 has a topside (or device side or simply a top) 906 and a backside or bottom 907.

FIGS. 9B-9E illustrate an upper lefthand portion 1102 of wafer 901 in cross section to show a process for fabrication of isolation trenches 1120 on the device side 906 of wafer 901. The trenches 1120 are filled with a dielectric material, which for one embodiment is silicon dioxide. The trenches 1120 so filled provide the electrical isolation between blades after the mirror is released. A dielectric layer 1103 also remains on the surface of the wafer 901 and is planarized after the fill process to ease subsequent lithographic patterning and eliminate surface discontinuities.

Figure 9B:
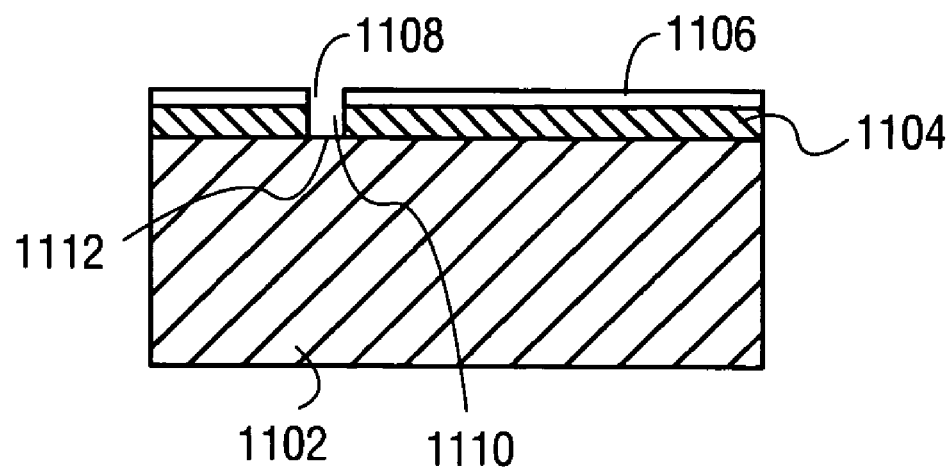

Referring to FIG. 9B, a silicon wafer 1102 is provided with a dielectric layer 1104, which for one embodiment is silicon dioxide (i.e., an oxide layer). The silicon wafer can be of arbitrary doping, resistivity, and crystal orientation, because the process depends only on reactive ion etching to carve and form the structures. The layer 1104 serves the function of protecting the silicon surface of the wafer during an isolation trench etch to follow, and thus represents a masking layer only. This masking layer can be formed from any number of techniques, including thermal oxidation of silicon or chemical vapor deposition (CVD). The typical thickness of the masking layer 1104 is 0.5-1.0 um. A photoresist 1106 is then spun onto the wafer and exposed and developed using standard photolithography techniques to define the isolation trench pattern 1108. Reactive ion etching is used to transfer the photoresist pattern to the mask layer 1104, as at 1110, exposing the silicon surface 1112. Typically, the silicon dioxide mask is etched in Freon gas mixture, for example $CHF_3$ or $CF_4$. High etch rates for silicon dioxide etching are achieved using a high density plasma reactor, such as an inductively coupled plasma ("ICP") chamber. These ICP chambers use a high power rf source to sustain the high density plasma and a lower power rf bias on the wafer to achieve high etch rates at low ion energies. Oxide etch rates of 200 nm/min and selectivities to photoresist greater than 1:1 are common for this hardware configuration.

Figure 9C:
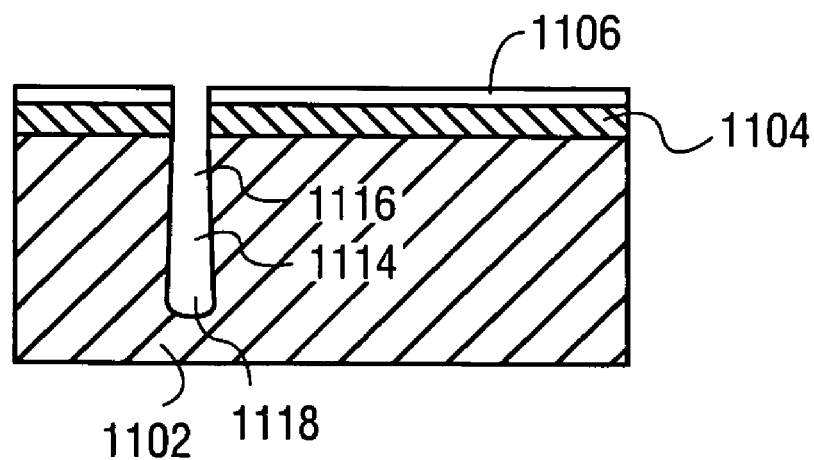

As illustrated in FIG. 9C, an isolation trench 1114 is next formed in the wafer 102 by deep reactive ion etching of silicon using high etch rate, high selectivity etching. The trench is commonly etched in a high density plasma using a sulfur hexaflouride ($SF_6$) gas mixture as described in U.S. Pat. No. 5,501,893. Preferably, the etch is controlled so that the trench profile is reentrant, or tapered, with the top 1116 of the trench being narrower than the bottom 1118 of the trench. This tapering ensures that good electrical isolation is achieved in subsequent processing. Profile tapering can be achieved in reactive ion etching by tuning the degree of passivation, or by varying the parameters (power, gas flows, pressure) of the discharge during the course of the etch. Because the trench is to be filled with dielectric, the opening at the top 1116 of the trench is chosen to be less than 2 um in width. The trench depth is typically in the range 10-50 um. A common procedure for etching the trench is to alternate etch steps ($SF_6$ and argon mixture) with passivation steps (Freon with argon) in an ICP plasma to achieve etch rates in excess of 2 um/min at high selectively to photoresist (>50:1) and oxide (>100:1). The power and time of the etch cycles are increased as the trench deepens to achieve the tapered profile. Although the trench geometry is preferably reentrant, arbitrary trench profiles can be accommodated with adjustments in microstructure processing. Good isolation results can be achieved with any of a number of known trench etch chemistries. After the silicon trench is etched, the photoresist layer 1106 is removed with wet chemistry or dry ashing techniques, and the masking layer 1104 is removed with a reactive ion etch ("RIE") or buffered hydrofluoric acid.

Figure 9D:
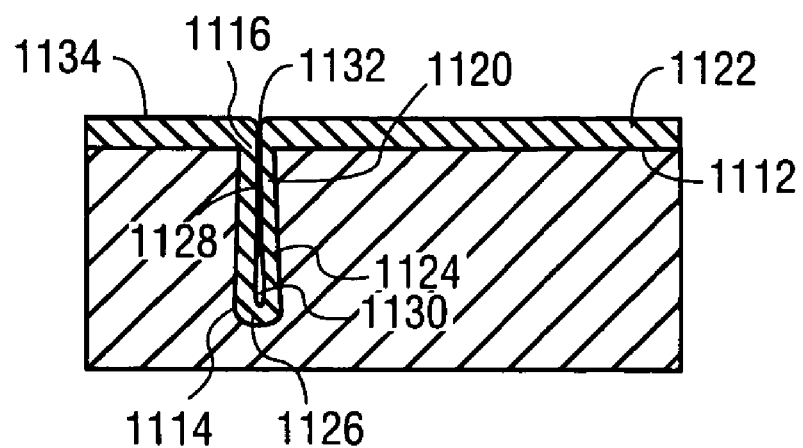

Referring to FIG. 9D, the isolation trench 1114 is then filled with an insulating dielectric material, typically silicon dioxide. The filling procedure results in the mostly solid isolation segment 1120 in the trench 1114, and serves to deposit a layer 1122 of dielectric material on the top surface 1112 of the silicon wafer and dielectric layers on the sidewall 1124 and bottom 1126 of the trench. The thickness of the deposited layer is usually in excess of 1 um. This fill can be accomplished with chemical vapor deposition ("CVD") techniques or preferably with oxidation of silicon at high temperatures. In thermal oxidation, the wafer is exposed to an oxygen rich environment at temperatures from 900-1150° C. This oxidation process consumes silicon surfaces to form silicon dioxide. The resulting volumetric expansion from this process causes the sidewalls of the trenches to encroach upon each other, eventually closing the trench opening. In a CVD fill, some dielectric is deposited on the walls but filling also occurs from deposition on the bottom of the trench. CVD dielectric fill of trenches has been demonstrated with TEOS or silane mixtures in plasma enhanced CVD chambers and low pressure CVD furnace tubes.

During a trench fill, it is common for most trench profiles to be incompletely filled, causing an interface 1128 and a void 1130 to be formed in the trench. A local concentration of stress in the void can cause electrical and mechanical malfunction for some devices, but is generally unimportant for micromechanical devices due to the enclosed geometry of the isolation segment 1120. The interface 1128 and void 1130 can be eliminated by shaping the trench to be wider at the trench opening 1116 than the trench bottom. However, good electrical isolation would then require additional tapering of the microstructure trench etch in the later steps. Another artifact of the trench filling is an indentation 1132 that is created in the surface of the dielectric 1134 centered over the isolation segment 1120. This indentation is unavoidable in most trench filling processes, and can be as deep as 0.5 um, depending on the thickness of the deposition.

Figure 9E:
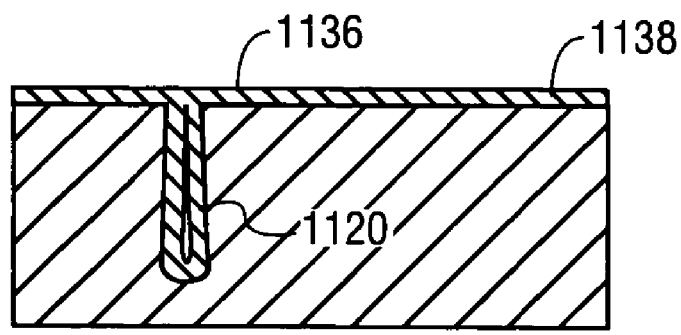

To remove the indentation 1132, the surface is planarized to form a flat surface 1136, as illustrated in FIG. 9E, for subsequent lithographic and deposition steps. Planarization is performed by depositing a viscous material, which can be photoresist, spin-on glass, or polymide, and flowing the material to fill the indentation 1132 to a smooth finish. During etchback, which is the second step of planarization, the surface 1136 is etched uniformly, including the filled indentation. Therefore, by removing part of the surface oxide 1122, the indentation 1132 is removed to create a uniform thickness layer 1138. For example, if the original dielectric layer 1122 is 2 um, then planarization to remove the indentation 1132 leaves a dielectric layer 1138 having a final thickness of less than 1 um. The surface 1136 of wafer is free from imperfection and is ready for further lithography and deposition.

Figure 9F:
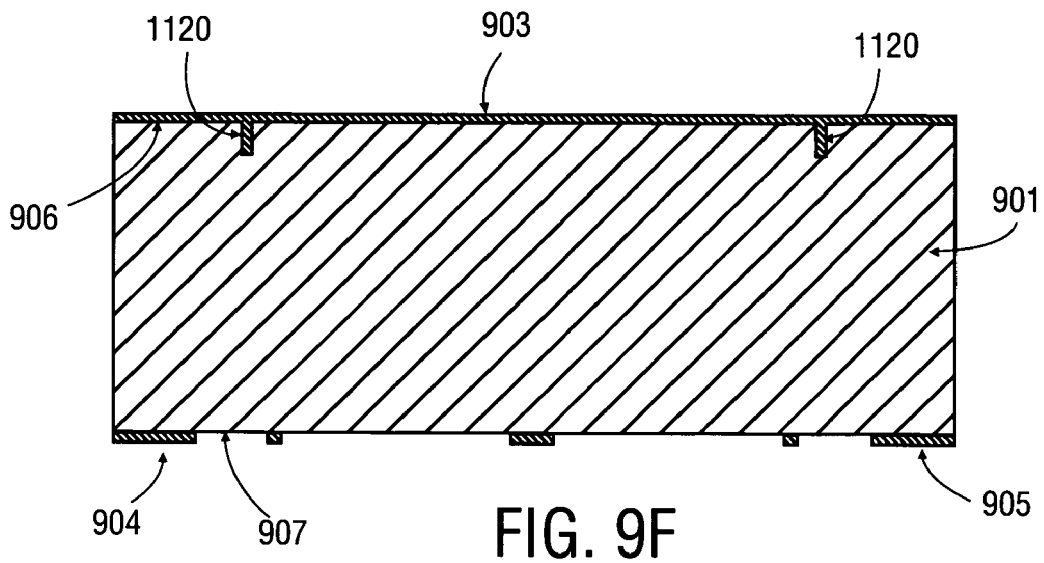

FIG. 9F shows silicon wafer 901 with dielectric layer 903 and isolation trenches 1120. After the isolation trenches 1120 are fabricated, standard front-to-back alignment is used to lithographically pattern the masking layer for the blades on the backside 907 of the wafer. The blade pattern 904 is exposed and etched into a dielectric masking layer 905. The masking layer is typically comprised of a combination of thermally grown silicon oxide and oxide deposited by chemical vapor deposition. The lithography pattern is transferred in the masking layer by reactive ion etching, yet the silicon blade etching is not completed until later in the process. Without the blades etched, the wafer is easily processed through the remaining device layers. The backside blade pattern 904 is typically aligned to the topside isolation trenches 1120 to within several microns.

Figure 9G:
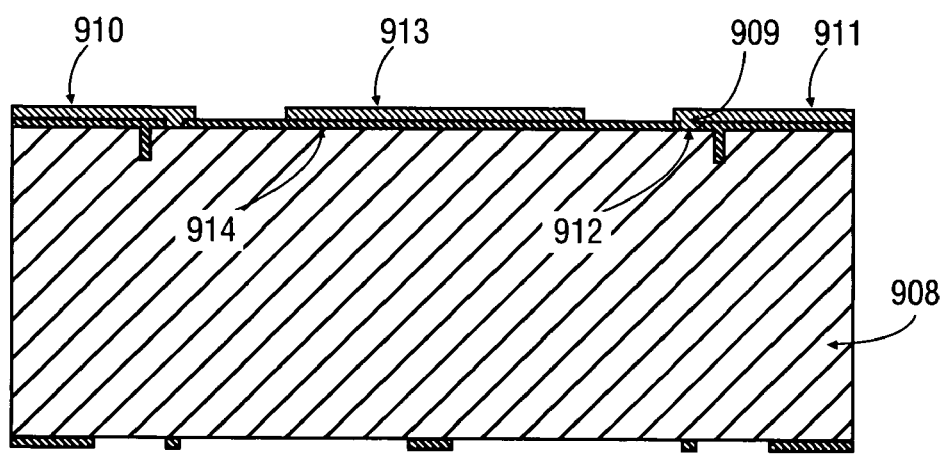

Metallization on the topside 906 of the wafer then proceeds as in FIG. 9G. In order to make contact to the underlying silicon 908 vias 909 are patterned and etched into the dielectric layer 903 using standard lithography and reactive ion etching. After the vias are etched, metalization 910 is deposited and patterned to form an interconnect 911 and a contact 912 to the silicon 908 through the via 909. For one embodiment, the metal is aluminum and is patterned using wet etching techniques. In mirror arrays with high interconnect densities, it is advantageous to pattern the metal using dry etching or evaporated metal lift-off techniques to achieve finer linewidths. The metal layer 910 is used to provide bond pads and interconnects, which connect electrical signals from control circuitry to each mirror to control mirror actuation.

Deposition of a second metal layer 913 provides a reflective mirror surface. This metal is tuned to provide high mirror reflectivities at the optical wavelengths of interest, and is typically evaporated and patterned using lift-off techniques to allow a broader choice of metallizations. For one embodiment, the metallization is comprised of 500 nm of aluminum. However, additional metal stacks such as Cr/Pt/Au may be used to increase reflectivities in the wavelength bands common to fiber optics. Because the metals are deposited under stress and will affect the eventual mirror flatness, it is advantageous to reduce the thickness of the dielectric 914 in the region of the mirror. This can be accomplished through the use of dry etching of the underlying dielectric prior to evaporation.

Figure 9H:
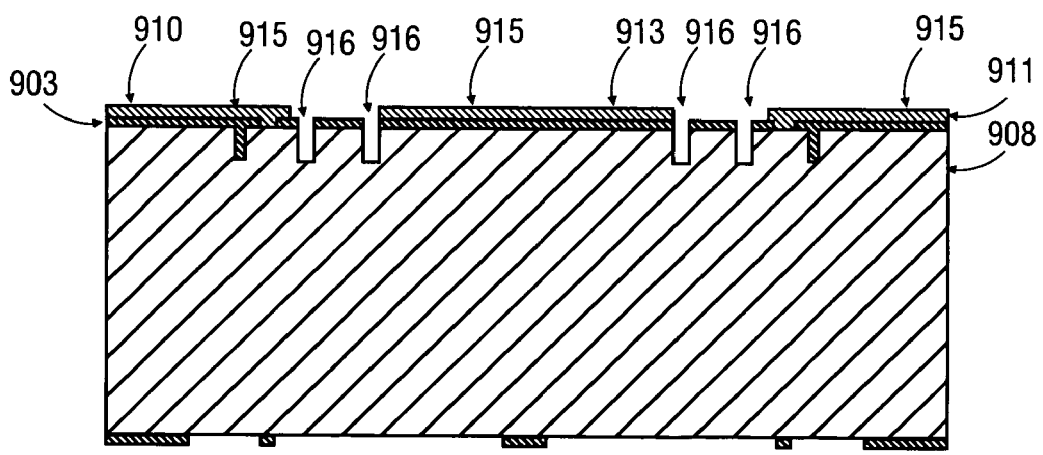

In FIG. 9H, the topside processing is completed. First, a passivation dielectric 915 on the metal surfaces 911 and 913 may be applied to protect the metallization during subsequent processing. The passivation is removed in the region of the bonding pads. Second, the mirror structure including frame, mirror, and supports are defined using multiple etches that define trenches 916 separating the structural elements. The etches are self-aligned and proceed through the various metal 910, dielectric 903, and silicon 908 layers. A further blanket deposition is applied to the topside which passivates the sidewalls of the trenches 916 and prepares the topside for mechanical release.

Figure 9I:
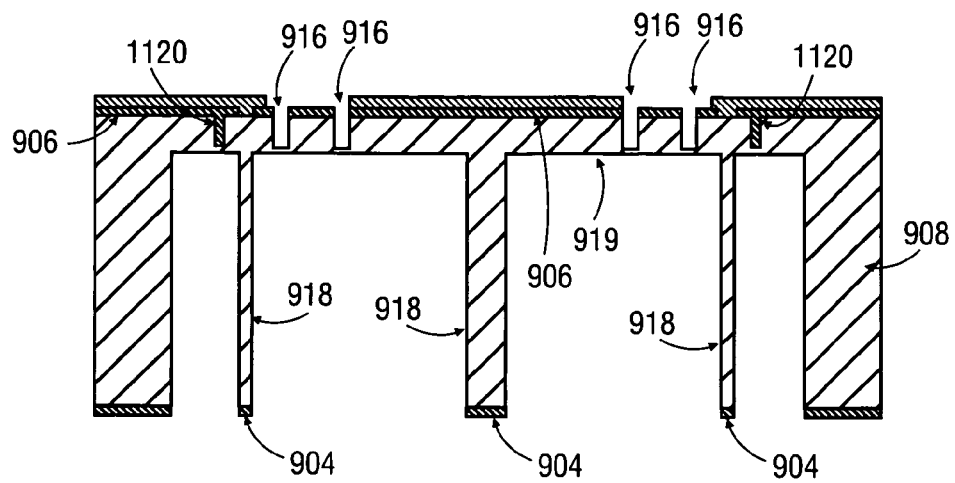

As shown in FIG. 9I, backside silicon etching transfers the blade pattern 904 into the substrate 908 to obtain the blades 918. The etching is performed using deep silicon etching at high selectivity to oxide using the techniques reported in U.S. Pat. No. 5,501,893 and now commonly used in the industry. The deep silicon etching achieves near vertical profiles in the blades 918, which can be nominally 5-20 um wide and in excess of 300 um deep. The etch is timed so that the etch front 919 approaches or just reaches the bottom of the isolation joints 1120 or the structure trenches 916, yet not to not punch through to the topside surface of the wafer 906. All blades 918 are etched simultaneously across the mirror element and across the mirror array.

Figure 9J:
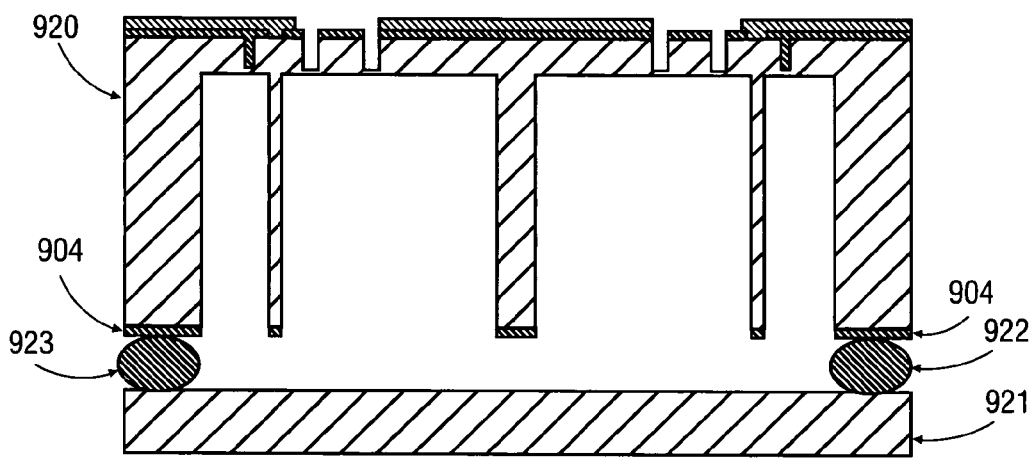

Referring to FIG. 9J, because the device wafer 920 is now prepared for microstructure release, the device wafer 920 becomes more susceptible to yield loss due to handling shock or air currents. In order facilitate handling and aid in hermetically sealing the mirror array, a base wafer 921 is bonded to the device wafer 920 to protect the blades after release. For one embodiment, the bonding is accomplished through the use of a frit glass material 922 that is heated to its flow temperature and then cooled. In this manner, a 400 degree centigrade temperature bond produces a hermetic seal 923 to surround the entire mirror array. The separation between the device wafer 920 and the base wafer 921 using the frit glass 922 allows the blades to swing through high rotation angles without impedance. Typically, the standoff required is greater than 25 um.

Figure 9K:
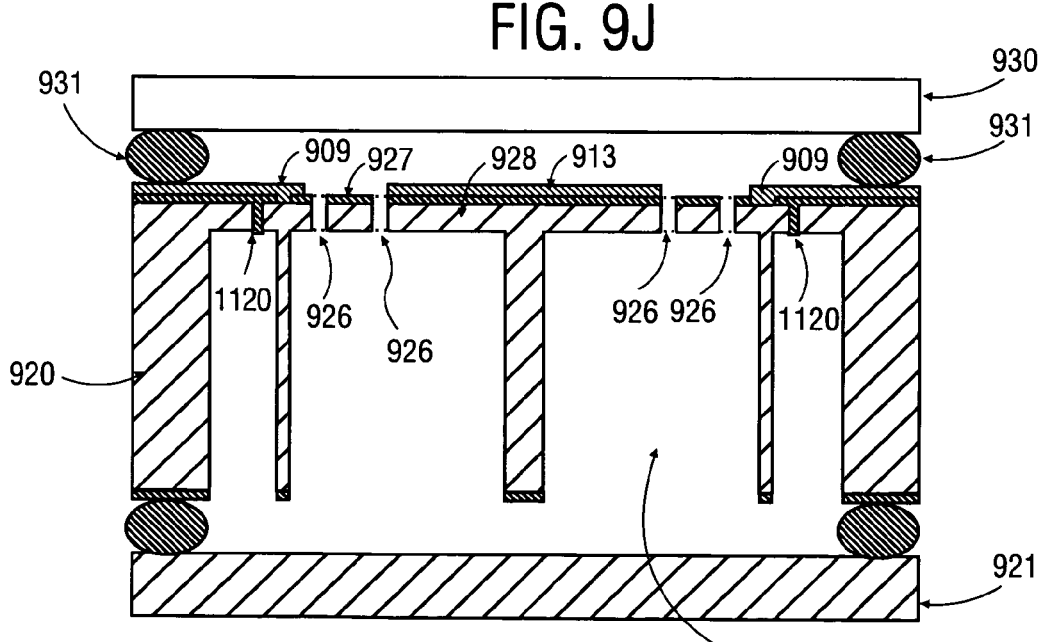

Final structure release is accomplished on the wafer topside in FIG. 9K using dry etching, which punctures through the trenches 916 to suspend the movable elements of the mirror 913 and the frame 927. In addition, the release etch promotes electrical isolation by separating, for example, the silicon of the frame 927 from the silicon of surrounding members 928 and 920. The vias 909 serve to connect the regions of silicon to the metal interconnects 911. To completely seal the mirrors from the outside environment, a lid wafer 930 is bonded to the device wafer 920, preferably through the frit glass seal 931. The lid wafer 930 is typically glass to allow incoming light to be transmitted with low loss in the mirror cavity 932, reflect off of the mirror surface 913, and transmit out of the mirror cavity.

Figure 10A:
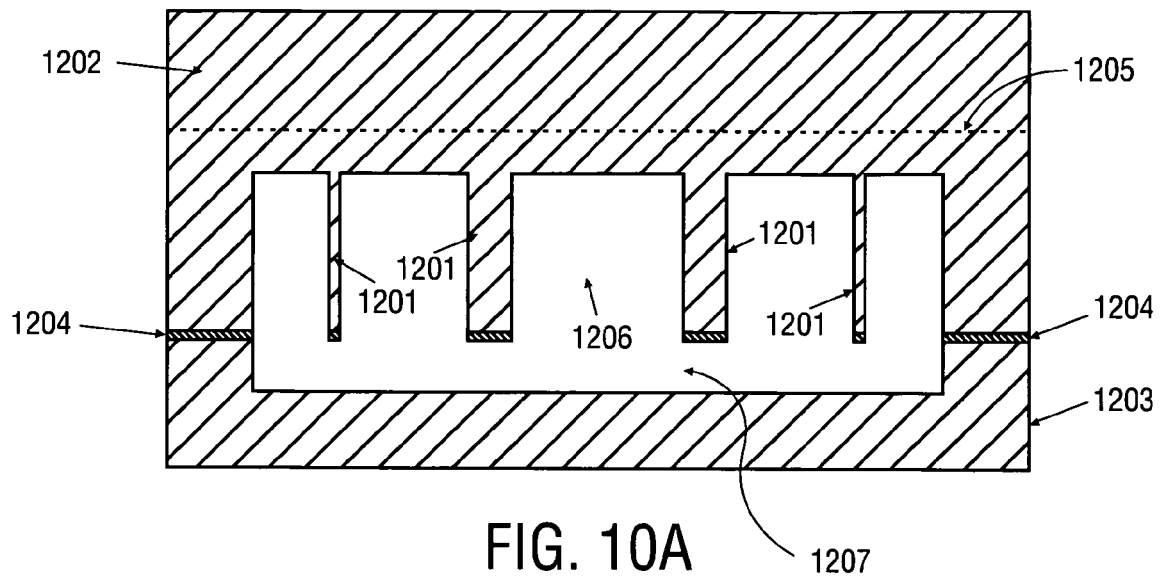
FIGS. 10A through 10E show cross sections associated with another method of fabricating a mirror cell.

FIGS. 10A-10E illustrate an alternative embodiment of the invention associated with a cross section of an alternative mirror cell (not shown) that cuts across four blades and three suspended sections of the mirror cell. For the embodiment of the invention shown in FIGS. 10A-10E, a bond and polish sequence is used to tune the depth of the blades to a value substantially less than the thickness of a normal wafer. Because thinner wafers are fragile and subject to significant handling loss, the base wafer is used early in the process to provide handling support. In FIG. 10A, the blades 1201 are patterned and etched using deep silicon etching techniques into the device wafer 1202 at the beginning of the process. The depth of the blade trench 1206 is tunable and depends on design, swing, and actuator deflection requirements. The blade depth may be 200 um, for example. A base wafer 1203 is then fusion bonded to the device wafer at the interface 1204. The fusion bonding process directly bonds silicon to silicon or silicon oxide and requires a high temperature anneal to form a strong bond. A recess 1207 is etched into the base wafer 1203 to provide the space necessary for the blades to rotate.

Figure 10B:
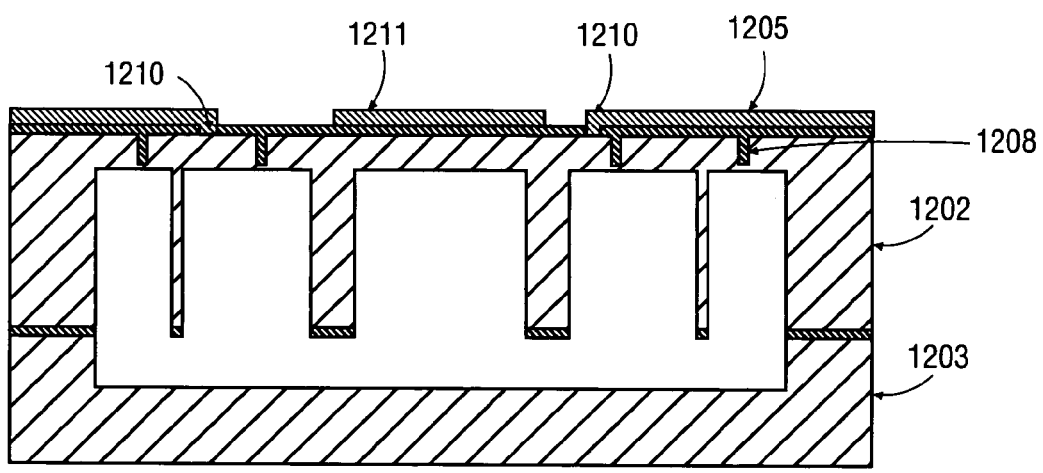

To proceed with topside processing, the device wafer 1202 is then polished down to establish a new topside surface 1205. This polishing step may remove several hundred microns of material. After the polishing, topside processing is performed. In FIG. 10B, isolation trenches 1208, vias 1210, metal interconnects 1205, and mirror metalization 1211 are fabricated in accordance with the sequence in FIGS. 9A-9H.

Alignment must be maintained between the device topside features and the blades. Several techniques are available to accomplish such alignment. For example, infared illumination passing through the wafer can be used to identify the location of the buried structures, such as blades. For another method, alignment marks can be placed on the backside of base wafer 1203. Those alignment marks are aligned with respect to the blades. Such marks require that the base wafer 1203 be carefully aligned with respect to wafer 1202 during the fusion bonding process. After the fusion bonding process, the topside features are then aligned with respect to the alignment marks on the base wafer 1203. Any number of these schemes may be used to ensure that the topside features align with respect to blades to within several microns.

Figure 10C:
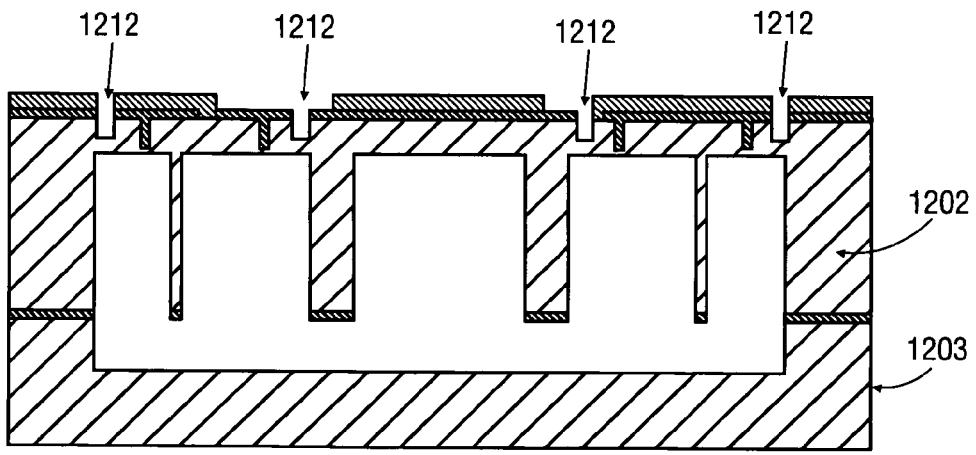
Figure 10D:
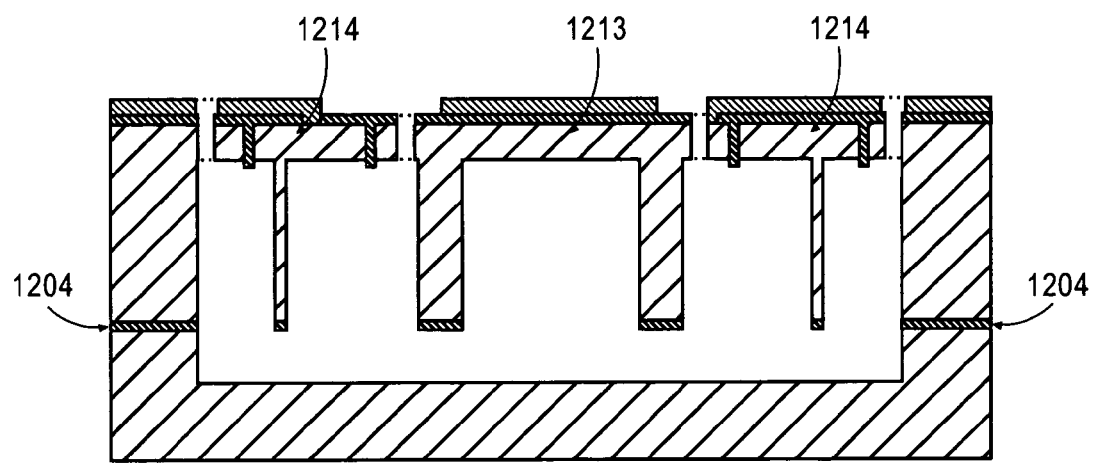
Figure 10E:
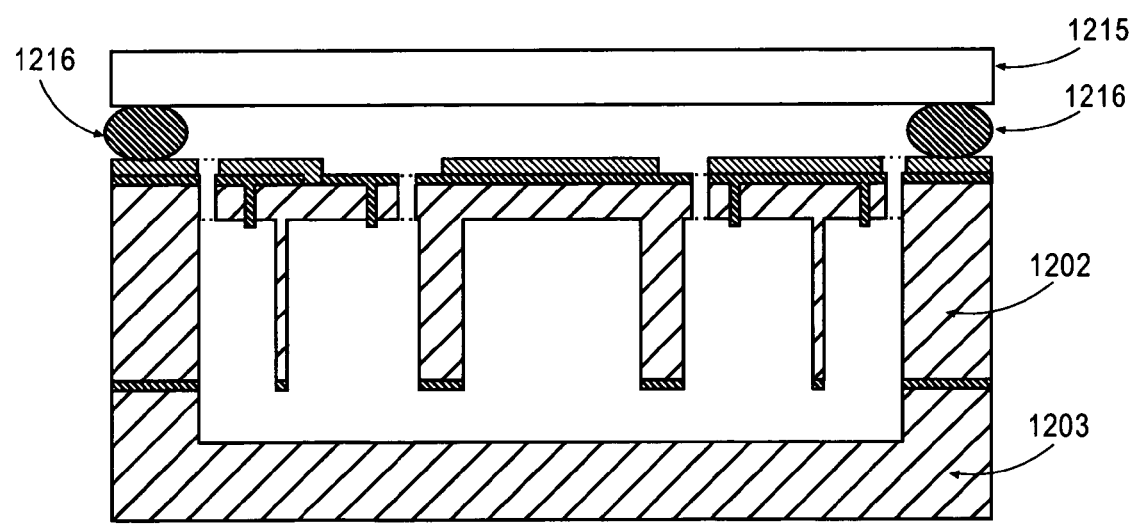

In FIG. 10C, structure trenches 1212 are etched into device wafer 1202, and release etching in FIG. 10D suspends the mirror 1213 and frame 1214 and frees the micromechanical mirror for motion. The entire device sequence can be performed because the bond interface 1204 remains unaffected by temperature cycling and unit processing after the bond anneal. Finally, in FIG. 10E, a glass lid 1215 is bonded to the device wafer 1202 using frit glass 1216 to hermetically seal the element from the environment.

Figure 11:
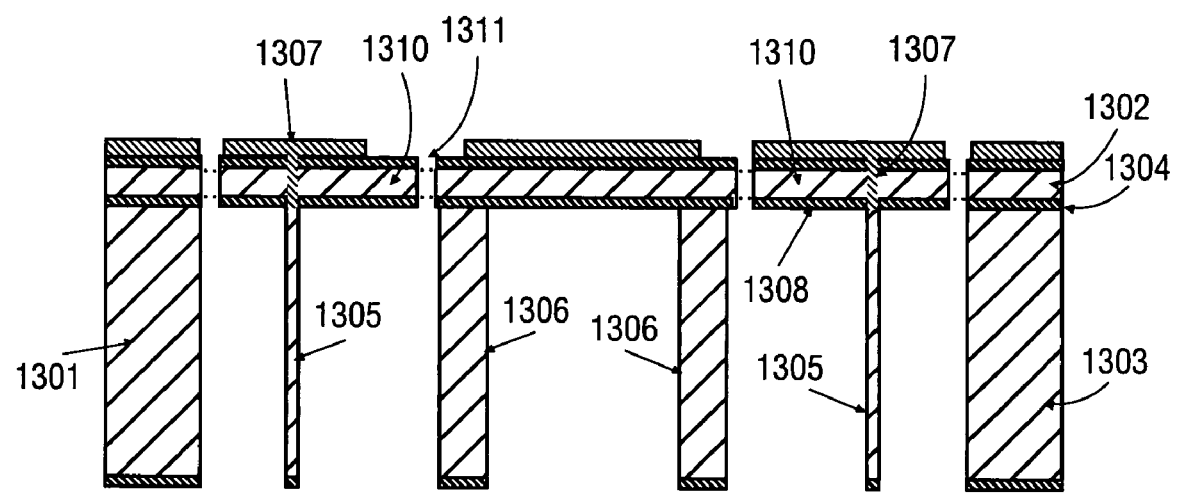
FIG. 11 shows a cross section of a silicon-on-insulator ("SOI") wafer that includes blades formed by deep silicon etching.

Other substrates such as silicon-on-insulator can be used with only slight modifications to the process. In FIG. 11, the device wafer using a silicon-on-insulator (SOI) substrate 1301 is shown. A thin silicon layer 1302 is separated from the blade layer 1303 by buried oxide layer 1304. Typically, the silicon layer is of the order of 5-20 um thick. The blade layer is typically 300-600 um thick. The oxide layer 1304 isolates the blades 1305 from the blades 1306 without the need for the isolation segments or trenches described with respect to FIGS. 9A-9K and 10A-10E. Vias 1307 connect through the oxide layer 1308 and connect to the blades 1305 and are isolated from the silicon layer 1310 through passivation of the via sidewalls. The requirements for metallization, structure definition, and microstructure release remain fundamentally the same as for the embodiment discussed with respect to FIGS. 9A-9K.

Because deep silicon etching is generally highly selective to silicon oxide, the buried layer 1304 provides an etch stop for the blade etch and also the structure etch that defines the trenches 1311. Release etching may be accomplished by etching through the oxide layer 1304 or by undercut methods.

The SOI method of FIG. 11 replaces the need for isolation trench etch and fill, but does not significantly impact the other aspects of the process flow. Thus, the fabrication techniques described with respect to FIGS. 9A-9K, 10A-10E, and 12A-12E can be used with the SOI substrate 1301 shown in FIG. 11, but without the need for respective isolation trenches.

Figure 12A:
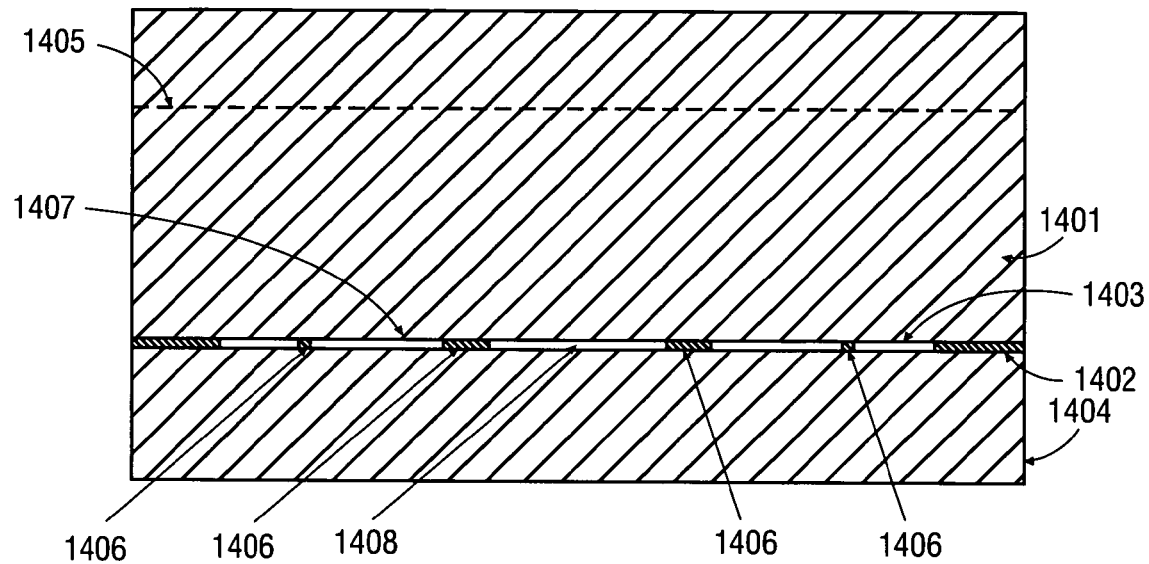
FIGS. 12A through 12E show cross sections associated with yet another method for fabricating a mirror cell.

Another improvement in the bonded wafer processes is shown in FIGS. 12A-12E. For this approach, the masking dielectric layer is patterned in the outline of the blades before fusion bonding, yet the blades themselves are not etched until later in the process. This enables the wafer stack to proceed through the polishing and trench isolation processes without compromising wafer fragility or introducing problematic membrane structures. In FIG. 12A, the backside dielectric 1402 of the device wafer 1401 is patterned and etched to define the blade masking 1406. The etch is not completed to the backside silicon surface 1407. Instead, a small amount of dielectric 1403 is left. Typically, the thickness of the dielectric 1403 is 500 nanometers (nm), and the total thickness of masking layer 1402 is 3 um. The device wafer 1401 is then fusion bonded to a spacer wafer 1404, bonding only at the blade patterns 1406. Sealed cavities 1408 remain at the bond interface after the bond anneal. Next, the device wafer is polished to interface 1405 to match the desired blade depth.

Figure 12B:
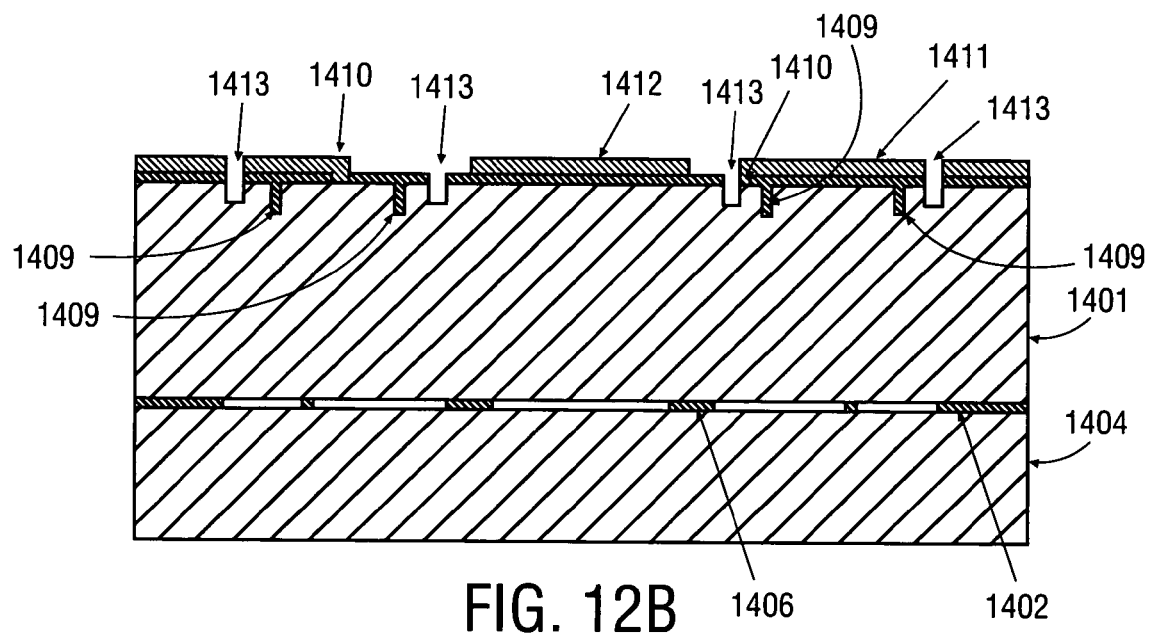
Figure 12C:
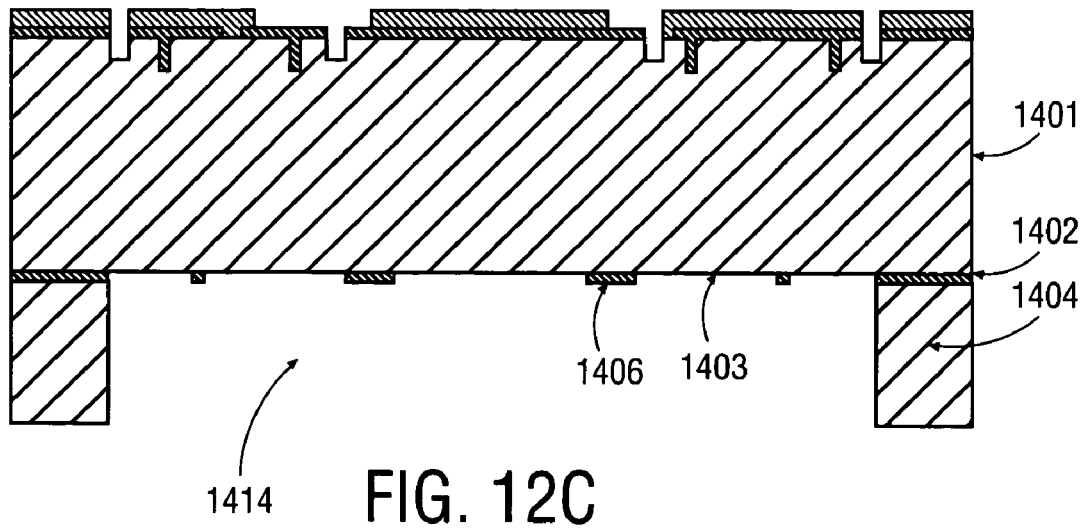

In FIG. 12B, the device wafer 1401 is processed in the manner of FIGS. 9A-9H to obtain filled isolation trenches 1409, vias 1410, interconnect metal 1411, mirror metal 1412, and trenches 1413. Alignment techniques such as those described with respect to FIG. 10B can be used to align such topside features to the blade patterns 1406. In FIG. 12C, a window or opening 1414 is patterned and etched through the silicon of spacer wafer 1404, which exposes the blade pattern 1406 in dielectric layer 1402. The silicon etch is highly selective and will stop on the blade pattern 1406 and the remaining dielectric mask 1403.

Figure 12D:
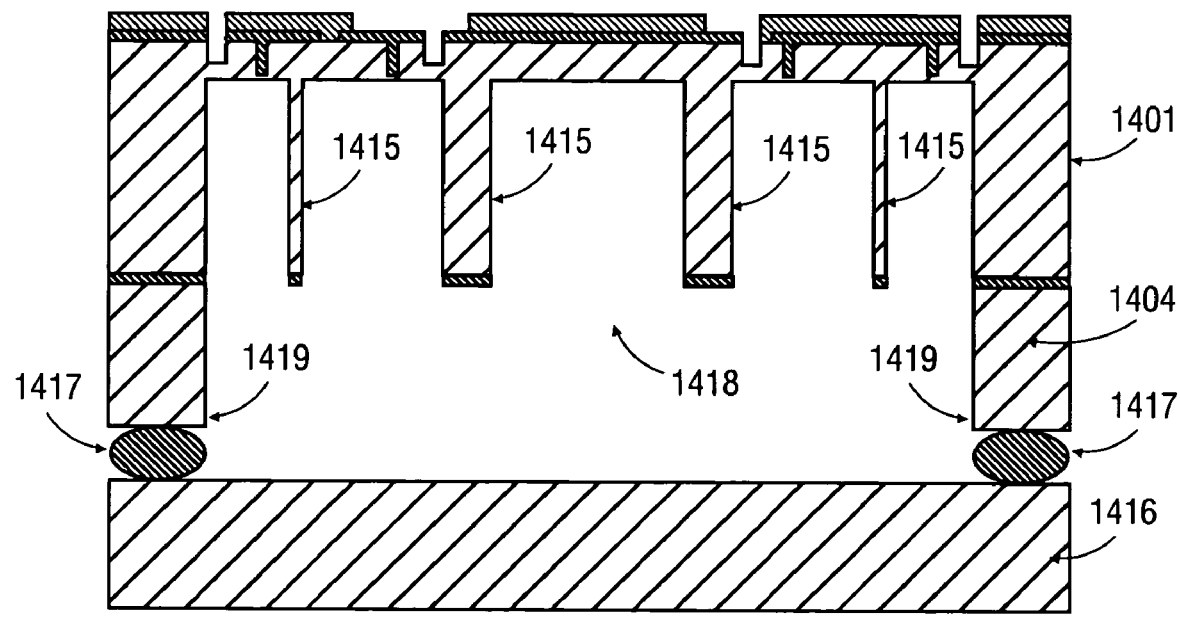

In FIG. 12D, the partially etched dielectric 1403 is removed in blanket etching, and blades 1415 are etched to desired depth. A base wafer 1416 bonded using glass frit 1417 ensures that the blades 1415 are protected from further damage. A cavity 1418 houses the blades, which are recessed from the bottom plane 1419 of the spacer wafer 1404.

Figure 12E:
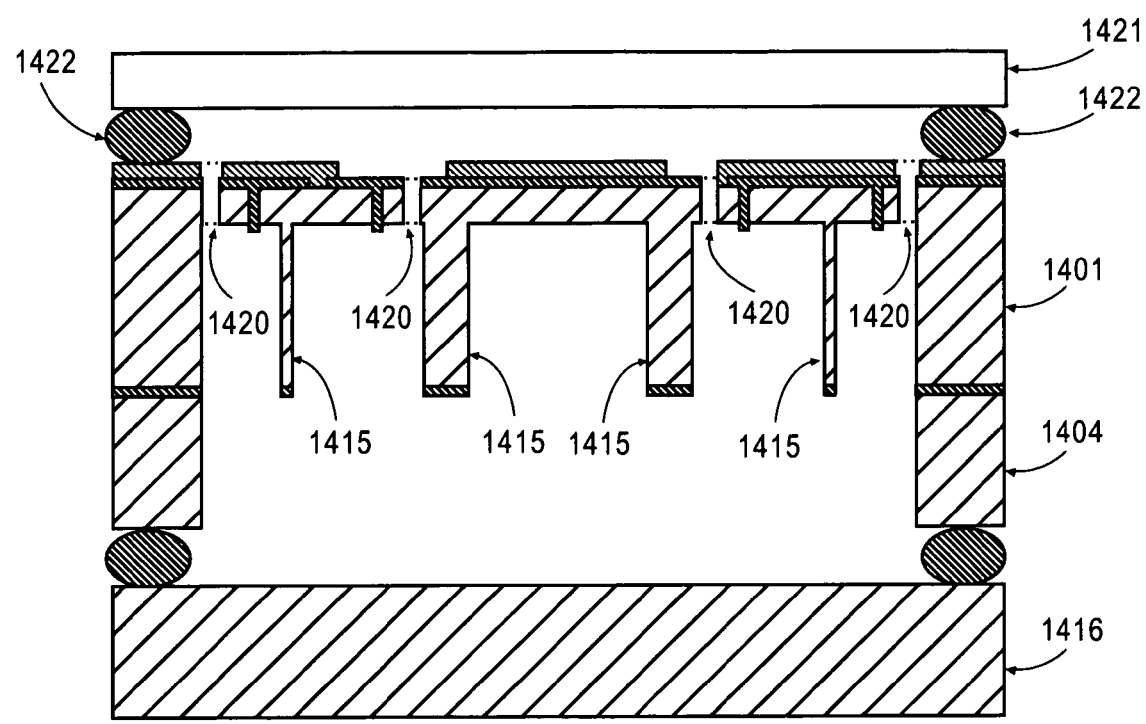

Finally, in FIG. 12E, the mirror structure is released by extending the trenches 1420 through the remaining silicon membranes. A glass lid 1421 bonded through frit glass 1422 completes the processing. The advantage of the recessed blade approach of FIGS. 12A-12E is that the blade etching is withheld until later in the process, ensuring that the device and spacer wafer stack is mechanically robust during polishing and the majority of the processing, and hence planarity of the top surface of the device wafer is ensured during all lithographic steps.

FIGS. 13A-13I show fabrication details for forming the structural beam elements 580 and flexures 503a, 503b, 504a, and 504b of mirror cell 500 shown in FIG. 5A. In particular, FIGS. 13A-13I illustrate, in perspective view, a process for forming two parallel cantilevered beams, each including an isolation segment. The parallel cantilevered beams can be structural elements or flexures that may or may not include isolation segments.

Figure 13C:
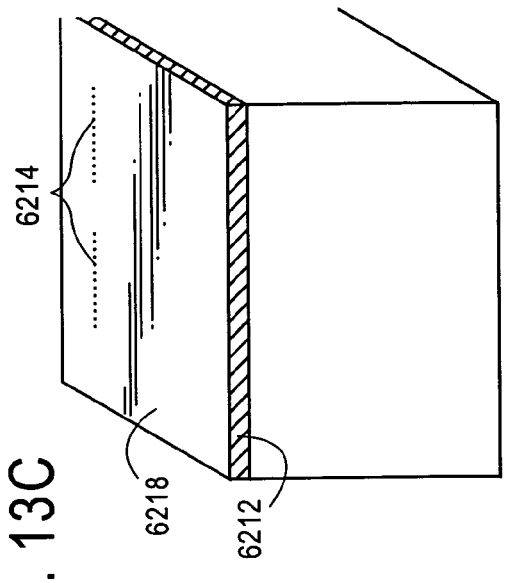
Figure 13D:
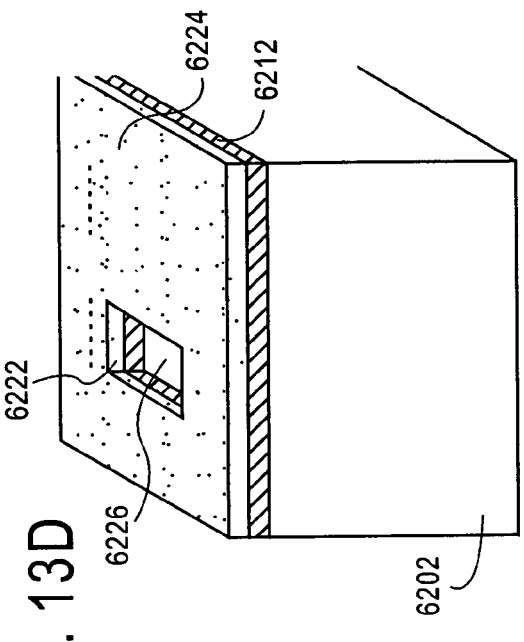
Figure 13A:
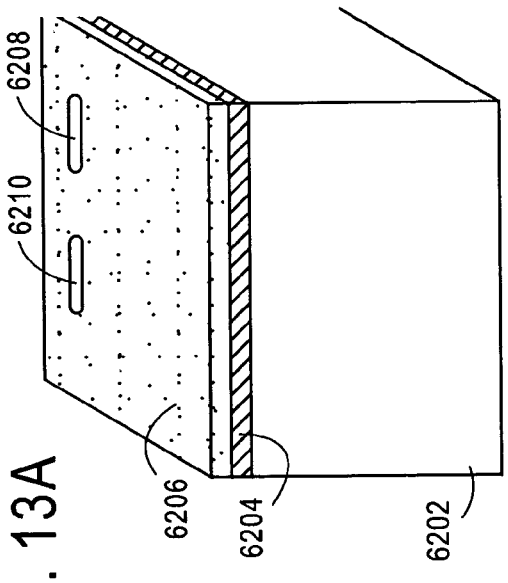

Referring to FIG. 13A, the process begins with a silicon wafer 6202 that has a dielectric masking layer 6204, which for one embodiment is silicon dioxide, and photoresist layer 6206. It is possible to begin the process without the dielectric layer and rely only on photoresist to mask the isolation trench etch. The photoresist is exposed and developed to create two isolation trench openings 6208 and 6210. This pattern is transferred to the dielectric using RIE, exposing the surface of the silicon substrate 6202. Isolation trenches are then etched into the substrate silicon using silicon RIE, with the depths and profiles described in detail in the description of FIGS. 9B-9E. The resist layer 6206 and the dielectric layer 6204 are stripped in preparation for trench filling.

Figure 13B:
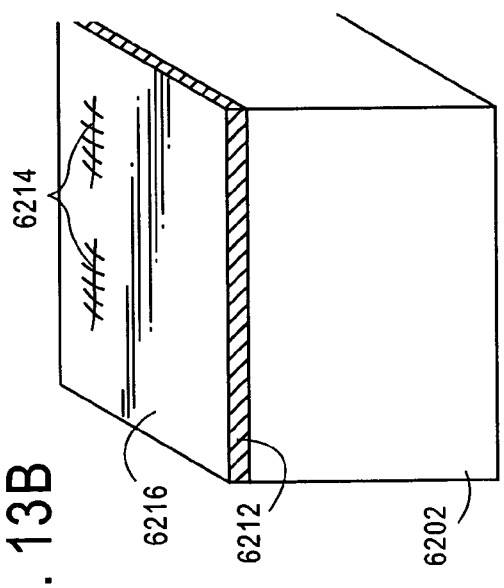
Figure 13G:
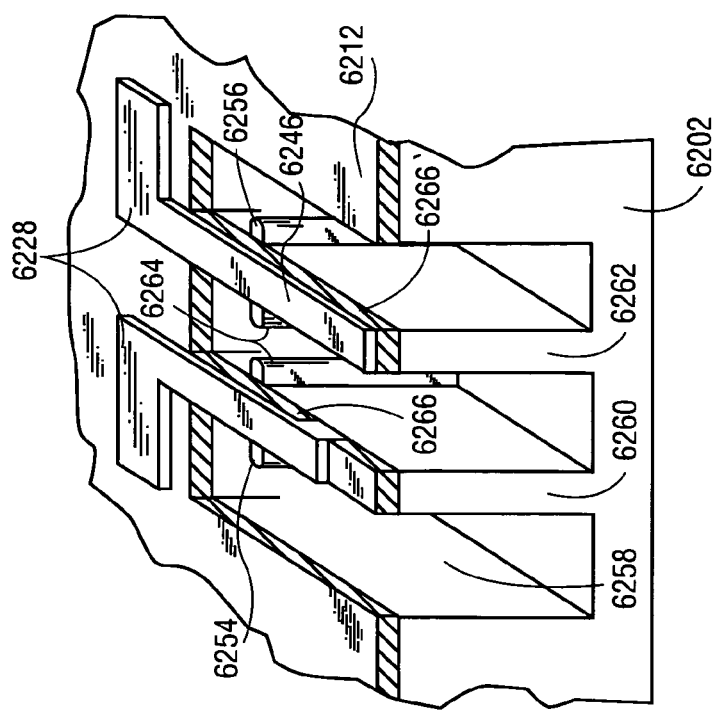

In FIG. 13B, the isolation trenches are filled using thermal oxidation or CVD techniques to create two isolation segments. The filling process results in a thick dielectric layer 6212 and indentations 6214 in the surface of the dielectric 6216, producing two solid isolation segments that are to be incorporated within the micromechanical structure. To remove the indentations, the surface is planarized using a deposition and etchback process. FIG. 13C shows the results of the planarization, which has removed most or all of the surface indentation 6214, leaving minimal features 6220 in the areas where the isolation trenches exist. The dielectric 6218 thickness will remain as a masking material and an insulating material for the final microstructure, and must therefore retain good electrical and mechanical qualities. The thickness of dielectric layer 6218 is preferably 0.5-1.0 um.

The next photolithographic step is illustrated in FIG. 13D, where a via pattern 6222 is exposed and developed in the photoresist layer 6224 by a normal lithography process. The resist pattern is transferred through the dielectric layer 6212 by reactive ion etching to reveal the silicon surface 6226 in the region of the via. Alternatively, the revealed silicon surface 6226 may remain protected by a thin sacrificial layer of dielectric 6212 in order to minimize surface damage during implantation. The wafer 6202 is implanted with dopants in the region of the via 6222, so as to provide a high conductivity region in the substrate 6202. A high temperature anneal activates the implant and prepares the wafer for metalization.

Figure 13E:
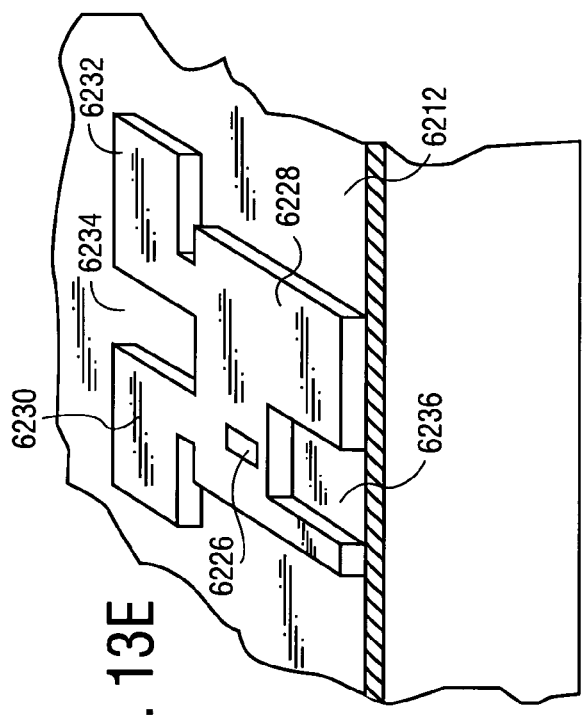

Metalization and coarse patterning of the metal is illustrated in FIG. 13E. A metal layer 6228, which for one embodiment is sputtered aluminum, is deposited onto the top surface of dielectric layer 6212, which insulates the metal from the silicon, except in regions where a via 6226 has been opened. The metal contacts the silicon in the via to form an ohmic contact. Because the metal is sputtered on a mostly continuous dielectric surface, the resulting metal layer can be patterned easily, using lithographic methods. To do this, a layer of photoresist (not shown) is exposed and developed, and the pattern is transferred to the metal with wet chemical etching or RIE. Because the feature sizes are generally greater than 5 um for this coarse patterning step, these lithography and etching steps are generally non-critical. The purpose of this coarse metal patterning step is to define multiple interconnects and pads for the microstructure to be formed in the wafer. Thus, for example, pads 6230 and 6232 are aligned with the eventual placement of microstructure beam elements and are separated by a gap 6234. Metal is also removed in region 6236 to break the conduction path on one of the eventual beam elements.

Figure 13F:
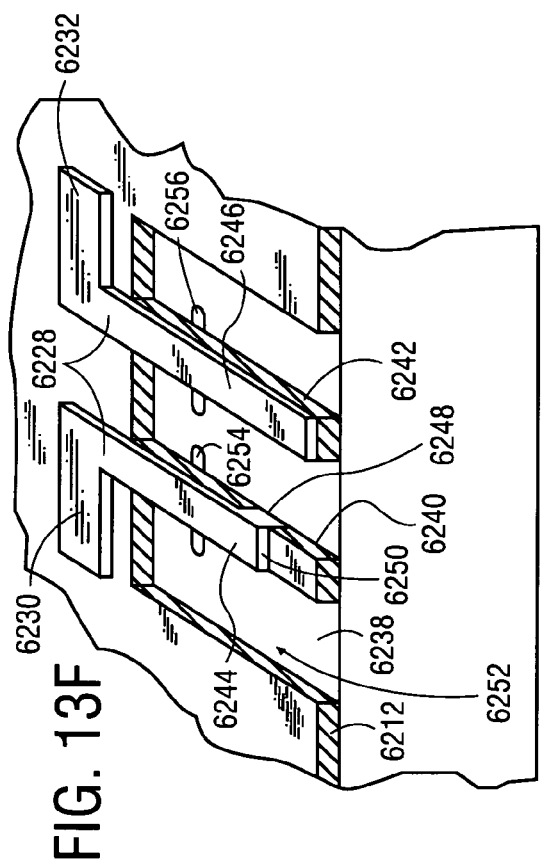

The final lithography layer, which is used to produce the micromechanical structure, is exposed and developed according to the illustration in FIG. 13F. The photoresist pattern (not shown) is transferred to the metal layer 6228 and to the dielectric layer 6212 using RIE techniques and defines an opening 6238 in the metal and dielectric layers in which beam elements 6240 and 6242 are placed. This opening serves as a mask for subsequent trench etching steps. The lithography also defines in the metal layer 6228 two metal interconnects 6244 and 6246 that attach to pads 6230 and 6232, respectively. The via through the dielectric layer 6212 defined in FIG. 13D is apparent at the location of the metal-silicon contact at 6248. The metal interconnect 6244 is terminated at location 6250, a result of the coarse metal patterning step.

The pattern transfer process etches the metal and dielectric to expose the silicon surface 6252 and isolation segments 6254 and 6256 in the mask opening 6238. The photoresist layer may remain or be removed for the deep silicon trench etch illustrated in FIG. 13G, which defines a deep trench 6258 surrounding silicon mesas or islands 6260 and 6262. The trench etch is carried out to a depth less than the depth of the isolation segments 6254 and 6256, which are exposed during the etch, as illustrated. The isolation segments are positioned by the lithography process so that they completely intersect and are perpendicular to the mesas 6260 and 6262. The anisotropic nature of the etch, coupled with the reentrant geometry of the segments themselves, ensures that no silicon filaments surround the exposed surface 6264 of the segments 6254 and 6256, for such filaments eventually would provide a current path to the substrate 6202. The single mask opening 6238 forces the metal interconnects 6244 and 6246 to be self-aligned with the dielectric layers 6266 and 6266' and the respective mesas 6260 and 6262. The etch process used for one embodiment of the invention is the Bosch process described in U.S. Pat. No. 5,501,893, which etches silicon selectively to the metal layer 6228 and the dielectric layer 6212 so that no degradation of the layers occurs during the structure trench etch.

In FIG. 13H, the microstructure is prepared for undercut and release of the beams according to U.S. Pat. No. 5,719,073 by a sidewall passivation scheme. A dielectric, which for one embodiment is silicon dioxide, is deposited using CVD techniques and forms a thin film on all surfaces. The thickness of the deposited film is less than 500 nm, and must be deposited at a temperature that will not harm the metal layer 6228. For one embodiment, the film that will form the sidewall passivation dielectric is deposited using plasma enhanced CVD ("PECVD") or high density plasma CVD ("HDPCVD") techniques and conformally coats all exposed surfaces. After the deposition, a blanket anisotropic RIE etch removes the film from the floor 6270 of the trench 6258 and from all other horizontal surfaces, such as the top surface 6272 of the metal layer 6228. Due to the anisotropic nature of the etch, sidewall films 6274 of the mesas remain intact to provide sidewall passivation which protects the silicon mesas 6260 and 6262 from the isotropic silicon release etch processes.

FIG. 13I illustrates a released microstructure after a release etch sequence that follows sidewall passivation. Often, the release etch is comprised of two separate etches—namely, a trench extension that exposes a larger silicon surface area and an isotropic release etch that undercuts the silicon mesas to form released beams 6276 and 6278. The trench extension is similar to the structure etch of FIG. 13G, and deepens the trench 6258 to expose silicon below the sidewall film 6274. This is followed by an isotropic release etch, which can be performed in a high density etch chamber in a mixture of $SF_6$ and Argon. The release etch is timed so that beams 6276 and 6278 are completely undercut and suspended over the silicon floor 6280, while wider features such as wall 6282 remain fixed to the substrate. The isolation segments 6254 and 6256 extend downwardly through the beams, as illustrated in FIG. 13H, to isolate the silicon of the beams 6276 and 6278 from the silicon of the substrate 6202. The metal pads 6230 and 6232 are connected to the beams at selected via locations by means of interconnects 6244 and 6246, resulting in multiple conduction paths or multiple connections to the microstructure. For one embodiment the beams 6276 and 6278 are a part of a larger micromechanical structure with an array of similar beams and interconnects, and are intended only to represent the isolation process. The sidewall films 6274 can remain on the microstructures or be removed by an isotropic dielectric etch. In general, the sidewall passivation film can be removed if its presence affects the behavior of the micromechanical structure.

There are numerous alternative variations that could be used for the operations used to fabricate the blade actuator and the associated frames and stages. For example, the aluminum metallization typically used for routing voltages to various blades could be made from other metals, such as copper, tungsten, or titanium. The isolation joints used to electrically isolate regions of the frames and stages are typically made from silicon dioxide, but could be made from silicon nitride, borophosphosilicate glass ("BPSG"), or combinations or silicon nitride and polysilicon. The isolation joints need to electrically isolate regions of the frames and stages for one to be able to apply the appropriate voltages to the blade actuators. Various materials could be used to achieve that result. With respect to the silicon used to form the blade actuator, the underlying requirement is a conductive material that holds the same shape. Currently silicon is a convenient material given the existing fabrication tools that are common to the semiconductor industry. Nevertheless, other materials meeting the underlying requirement can be used for alternative embodiments.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for fabricating a microelectromechanical apparatus comprising:
   forming a layer of dielectric material on a first side of the substrate;
   forming on the first side of the substrate vertical isolation trenches containing dielectric material;
   patterning a masking layer on a second side of the substrate that is opposite to the first side of the substrate;
   forming vias on the first side of the substrate;
   metallizing the first side of the substrate;
   forming second trenches on the first side of the substrate to define structures;
   deeply etching the second side of the substrate to form narrow blades;
   after forming the narrow blades, bonding a base wafer to the second side of the substrate;
   etching through the vias on the first side of the substrate to release the structures and to provide electrical isolation, wherein at least one of the narrow blades is isolated by one of the vertical isolation trenches, and wherein at least one of the narrow blades is coupled to one of the structures.

2. The method of claim 1, wherein the substrate comprises a silicon wafer.

3. The method of claim 1, wherein the dielectric material is silicon dioxide.

4. The method of claim 1, further comprising depositing a second metal layer on the first side of the substrate after metallizing the first side of the substrate in order to form a reflective surface.

5. The method of claim 1, further comprising forming a passivation layer on the first side of the substrate after metallizing the first side of the substrate.

6. The method of claim 1, further comprising attaching a protective lid to the first side of the substrate.

7. The method of claim 6, wherein the protective lid comprises glass.

8. A method for fabricating a microelectromechanical apparatus, comprising:
   patterning a masking layer on a second side of a substrate having a first side that is opposite to the second side of the substrate;
   deeply etching the second side of the substrate to form narrow blades;
   after forming the narrow blades, fusion bonding a recessed base wafer to the second side of the substrate;
   forming a layer of dielectric material on the first side of the substrate;
   forming on the first side of the substrate vertical trenches containing dielectric material;
   forming vias on the first side of the substrate;
   metallizing the first side of the substrate;
   forming second trenches on the first side of the substrate to define structures;
   etching through the vias on the first side of the substrate to release the structures, wherein at least one of the narrow blades resides between two of the vertical trenches, and wherein at least one of the narrow blades is coupled to one of the structures.

9. The method of claim 8, wherein the substrate comprises a silicon wafer.

10. The method of claim 8, further comprising thinning the first side of the substrate prior to forming a layer of dielectric material on the first side of the substrate.

11. The method of claim 8, wherein the dielectric material is silicon dioxide.

12. The method of claim 8, further comprising depositing a second metal layer on the first side of the substrate after metallizing the first side of the substrate in order to form a reflective surface.

13. The method of claim 8, further comprising forming a passivation layer on the first side of the substrate after metallizing the first side of the substrate.

14. The method of claim 8, further comprising attaching a protective lid to the first side of the substrate.

15. The method of claim 14, wherein the protective lid comprises glass.

16. A method for fabricating a microelectromechanical apparatus comprising:

forming a layer of dielectric material on a first side of a silicon-on-insulator (SOI) substrate;

patterning a masking layer on a second side of the SOI substrate that is opposite to the first side of the SOI substrate;

forming vias on the first side of the SOI substrate that extend through a buried oxide layer of the SOI substrate;

metallizing the first side of the SOI substrate;

forming trenches on the first side of the SOI substrate to define structures;

forming a passivation layer on the first side of the substrate on metallization of the first side of the SOI substrate and on sidewalls of the vias and trenches of the first side of the SOI substrate;

deeply etching the second side of the SOI substrate to form narrow blades, wherein at least one narrow blade is coupled to one of the structures and wherein at least one narrow blade resides beneath at least one via;

after forming the narrow blades, bonding a base wafer to the second side of the SOI substrate;

etching through the vias on the first side of the substrate to release the structures.

17. The method of claim 16, wherein the SOI substrate comprises an SOI wafer.

18. The method of claim 16, further comprising using a frit glass seal to attach a glass protective lid to the first side of the SOI substrate.

19. The method of claim 16, wherein the dielectric material is silicon dioxide.

20. The method of claim 16, further comprising depositing a second metal layer on the first side of the SOI substrate after metallizing the first side of the SOI substrate in order to form a reflective surface.

21. The method of claim 16, wherein deeply etching the second side of the substrate to form narrow blades comprises etching to the buried oxide layer of the SOI substrate.

22. A method for fabricating a microelectromechanical apparatus, comprising:

patterning a masking layer on a second side of the substrate that is opposite to a first side of the substrate;

attaching a spacer substrate to the second side of the substrate resulting in cavities;

forming a layer of dielectric material on the first side of the substrate; forming on the first side of the substrate vertical trenches containing dielectric material;

forming vias on the first side of the substrate;

metallizing the first side of the substrate;

forming second trenches on the first side of the substrate to define structures;

etching an opening through the spacer substrate to expose the masking layer on the second side of the substrate;

deeply etching the second side of the substrate to form narrow blades;

after forming the narrow blades, bonding a base wafer to the spacer substrate;

etching through the vias on the first side of the substrate to release the structures, wherein at least one of the narrow blades resides between two of the vertical trenches, and wherein at least one of the narrow blades is coupled to one of the structures.

23. The method of claim 22, wherein the substrate comprises a silicon wafer.

24. The method of claim 22, wherein the dielectric material is silicon dioxide.

25. The method of claim 22, further comprising depositing a second metal layer on the first side of the substrate after metallizing the first side of the substrate in order to form a reflective surface.

26. The method of claim 22, further comprising forming a passivation layer on the first side of the substrate after metallizing the first side of the substrate.

27. The method of claim 22, further comprising attaching a protective lid to the first side of the substrate.

28. The method of claim 27, wherein the protective lid comprises glass.

* * * * *